US011930434B2

(12) United States Patent
Suzuki et al.

(10) Patent No.: US 11,930,434 B2
(45) Date of Patent: Mar. 12, 2024

(54) WIRELESS COMMUNICATION APPARATUS, WIRELESS COMMUNICATION SYSTEM, WIRELESS COMMUNICATION METHOD, CONTROL CIRCUIT, AND RECORDING MEDIUM

(71) Applicant: MITSUBISHI ELECTRIC CORPORATION, Tokyo (JP)

(72) Inventors: Kazumasa Suzuki, Tokyo (JP); Shusaku Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 17/361,638

(22) Filed: Jun. 29, 2021

(65) Prior Publication Data

US 2021/0329433 A1    Oct. 21, 2021

Related U.S. Application Data

(63) Continuation of application No. PCT/JP2019/008620, filed on Mar. 5, 2019.

(51) Int. Cl.
*H04W 4/42* (2018.01)
*H04B 17/309* (2015.01)
(Continued)

(52) U.S. Cl.
CPC ............ *H04W 4/42* (2018.02); *H04B 17/309* (2015.01); *H04W 4/44* (2018.02); *H04W 72/044* (2013.01);
(Continued)

(58) Field of Classification Search
CPC .. H04B 17/309; H04B 17/336; H04B 17/382; H04W 24/00; H04W 4/42; H04W 4/44;
(Continued)

(56) References Cited

U.S. PATENT DOCUMENTS

2011/0255570 A1* 10/2011 Fujiwara ............... H04B 1/7143
 375/E1.033
2015/0030011 A1* 1/2015 Liu ....................... H04L 1/1893
 370/336
(Continued)

FOREIGN PATENT DOCUMENTS

CN        108366399 A  *  8/2018   ........ H04W 36/0011
EP        3 493 596 A1    6/2019
(Continued)

OTHER PUBLICATIONS

Office Action issued in Japanese Patent Application No. 2019-535968, dated Nov. 5, 2019.
(Continued)

*Primary Examiner* — Awet Haile
(74) *Attorney, Agent, or Firm* — Birch, Stewart, Kolasch & Birch, LLP

(57) ABSTRACT

A wireless communication apparatus that allocates radio resources is a base station or a mobile station that transmits a data series on a frequency channel in a frequency hopping pattern corresponding to a radio resource time slot. The apparatus includes a transmission quality measurement unit that measures radio waves in a frequency band used in the transmission of the data series and evaluates transmission quality, and the radio resources including a reserved resource and spare resources, a resource allocation unit that allocates, to the mobile station lower than or equal to a threshold value in transmission quality of a frequency channel used in a reserved resource time slot, a time slot that improves frequency channel transmission quality, of spare resource time slots. The mobile station transmits the data series, using the spare resource time slot when allocation information on the spare resource is obtained, or using the
(Continued)

reserved resource time slot when the allocation information on the spare resource is not obtained.

9 Claims, 19 Drawing Sheets

(51) Int. Cl.
| | | |
|---|---|---|
| *H04W 4/44* | (2018.01) | |
| *H04W 72/04* | (2023.01) | |
| *H04W 72/044* | (2023.01) | |
| *H04W 72/08* | (2009.01) | |
| *H04W 72/542* | (2023.01) | |
| *H04W 84/00* | (2009.01) | |

(52) U.S. Cl.
CPC ........ *H04W 72/542* (2023.01); *H04W 84/005* (2013.01)

(58) Field of Classification Search
CPC ........... H04W 72/044; H04W 72/0446; H04W 72/54; H04W 72/542; H04W 84/005
See application file for complete search history.

(56) References Cited

U.S. PATENT DOCUMENTS

| | | |
|---|---|---|
| 2019/0028214 A1 | 1/2019 | Suzuki et al. |
| 2019/0174383 A1* | 6/2019 | Zhang .................. H04W 36/08 |
| 2020/0112896 A1* | 4/2020 | Kondareddy ....... H04W 72/542 |
| 2020/0137693 A1* | 4/2020 | Wang ................ H04W 72/0473 |
| 2021/0014015 A1 | 1/2021 | Suzuki |
| 2021/0352683 A1* | 11/2021 | Han .................... H04W 72/543 |

FOREIGN PATENT DOCUMENTS

| | | | |
|---|---|---|---|
| JP | 2009-171078 A | 7/2009 | |
| JP | 6779414 B2 | 11/2020 | |
| WO | WO 2017/130317 A1 | 8/2017 | |
| WO | WO-2017130317 A1 * | 8/2017 | ............... B01L 3/12 |

OTHER PUBLICATIONS

Office Action issued in Japanese Patent Application No. 2019-535968, dated Sep. 17, 2019.
German Office Action for corresponding German Application No. 112019006799.0, dated Nov. 22, 2023, with English translation.

* cited by examiner

| | | TRANSMISSION ERROR RATE (y) | TRANSMISSION QUALITY |
|---|---|---|---|
| EVALUATION VALUE (x) | 3 | $y \leq 10^{-3}$ | ↑ GOOD |
| | 2 | $10^{-3} < y \leq 10^{-2}$ | |
| | 1 | $10^{-2} < y \leq 10^{-1}$ | |
| | 0 | $10^{-1} < y$ | ↓ POOR |

| SLOT | ALLOCATION |
|---|---|
| 0 | RESERVED |
| 1 | RESERVED |
| 2 | (1) |
| 3 | UNUSED |
| 4 | UNUSED |

| SLOT | ALLOCATION |
|---|---|
| 0 | RESERVED |
| 1 | RESERVED |
| 2 | (2) |
| 3 | UNUSED |
| 4 | UNUSED |

FIG.19

| FREQUENCY CHANNEL | EVALUATION VALUE |
|---|---|
| 0 | 0 |
| 1 | 1 |
| 2 | 3 |

FIG.20

| THE NUMBER OF RESERVED RESOURCES |
|---|
| 2 |

WIRELESS COMMUNICATION APPARATUS, WIRELESS COMMUNICATION SYSTEM, WIRELESS COMMUNICATION METHOD, CONTROL CIRCUIT, AND RECORDING MEDIUM

CROSS-REFERENCE TO RELATED APPLICATION

This application is a continuation application of International Application PCT/JP2019/008620, filed on Mar. 5, 2019, and designating the U.S., the entire contents of which are incorporated herein by reference.

BACKGROUND OF THE INVENTION

1. Field of the Invention

The disclosure relates to a wireless communication apparatus that performs wireless communication by a frequency-hopping method, a wireless communication system, a wireless communication method, a control circuit, and a recording medium.

2. Description of the Related Art

In recent years, a wireless train control system has received attention in which wireless communication is performed between a train and a wireless base station installed along a track, and operation control, speed control, etc. of the train are performed based on information transmitted by the wireless communication. The wireless train control system is advantageous in terms of introduction cost, maintenance cost, etc. because it eliminates the need for track circuits as compared with a conventional train operation control method using fixed block sections. Further, the wireless train control system can construct flexible block sections without being bound by fixed sections and therefore can increase train operation density, and is advantageous also in terms of operating cost.

The wireless train control system often uses the 2.4 GHz industry-science-medical (ISM) band, which does not require a license, for wireless communication between the ground and trains from the perspective of costs. However, the 2.4 GHz ISM band is widely used in other systems such as wireless local area networks (LAN) and Bluetooth (registered trademark). When these other systems are used in trains, in buildings along the track, etc., they can be a great interference source to the wireless train control system. Therefore, the wireless train control system requires measures against interference from other systems to perform stable communication. One of the measures against interference from other systems is the use of a frequency-hopping method in wireless communication to actively avoid interference. Japanese Patent Application Laid-open No. 2009-171078 discloses a technique in which base stations each have two hopping patterns using mutually different frequency channels, and select a frequency channel to be used for each slot from the two hopping patterns according to radio wave conditions.

In a cellular system having a cell configuration, interference from other systems is generally less than that in the wireless train control system. Therefore, the cell size is determined such that the reception level of receivers at the edge of a cell is near the reception sensitivity. Thus, the cell size largely depends on the transmission power of transmitters and the reception sensitivity of receivers.

On the other hand, in the wireless train control system, base stations are arranged such that the reception level of receivers at the edge of a cell is higher than the reception sensitivity level to allow communication in spite of a lot of interference from other systems. Consequently, in the wireless train control system, radio waves from a farther base station using the same frequency channel can come in as interference as compared with general cellular systems. In particular, in the wireless train control system, base stations are often arranged on a straight line with good visibility. Depending on geographical conditions, radio waves from a base station placed far away can come in at a great level. This also applies to a system that performs frequency hopping. In a certain base station, radio waves from a base station having the same hopping pattern can collide on a frequency channel used, causing interference. Therefore, it is desirable that base stations to which the same hopping pattern is assigned be positioned as far away as possible from each other.

In Japanese Patent Application Laid-open No. 2009-171078, when there are sixteen frequency channels, and each base station holds two different hopping patterns, in principle, the same hopping pattern is assigned to base stations at a distance of eight cells at a maximum from each other. This is because when two different hopping patterns of sixteen hopping patterns corresponding to the sixteen frequency channels are assigned to each base station, a maximum of 16/2=8 base stations are assigned. Therefore, there is a problem that a base station described in Japanese Patent Application Laid-open No. 2009-171078 is reduced by half in the distance from a base station to which the same hopping pattern is assigned as compared with when the base station does not have two hopping patterns, and can be a great source of interference with electric power.

SUMMARY OF THE INVENTION

In order to solve the above-mentioned problem and achieve the object, a wireless communication apparatus according to the present disclosure allocates radio resources, and is a base station or a mobile station that transmits a data series on a frequency channel in a frequency hopping pattern corresponding to a radio resource time slot. The wireless communication apparatus includes a transmission quality measurement unit that measures radio waves in a frequency band used in the transmission of the data series and evaluates transmission quality, and the radio resources including a reserved resource that is a time slot fixedly allocated to the mobile station located in a cell that is a communication range of the base station, and spare resources that are time slots that can be allocated to the mobile station located in the cell, a resource allocation unit that allocates, to the mobile station lower than or equal to a threshold value in transmission quality of a frequency channel used in the reserved resource time slot, a time slot that improves frequency channel transmission quality, of the spare resource time slots. The mobile station transmits the data series, using the spare resource time slot when allocation information on the spare resource is obtained, or using the reserved resource time slot when the allocation information on the spare resource is not obtained.

BRIEF DESCRIPTION OF THE DRAWINGS

FIG. 19 is a diagram illustrating an example of transmission quality information of which a ground station notifies the on-board station in notification information according to the second embodiment;

FIG. 20 is a diagram illustrating an example of reserved resource information of which the ground station notifies the on-board station in the notification information according to the second embodiment;

DETAILED DESCRIPTION OF THE PREFERRED EMBODIMENTS

Hereinafter, a wireless communication apparatus, a wireless communication system, and a wireless communication method according to embodiments of the present disclosure will be described in detail with reference to the drawings.

First Embodiment

Figure 1:
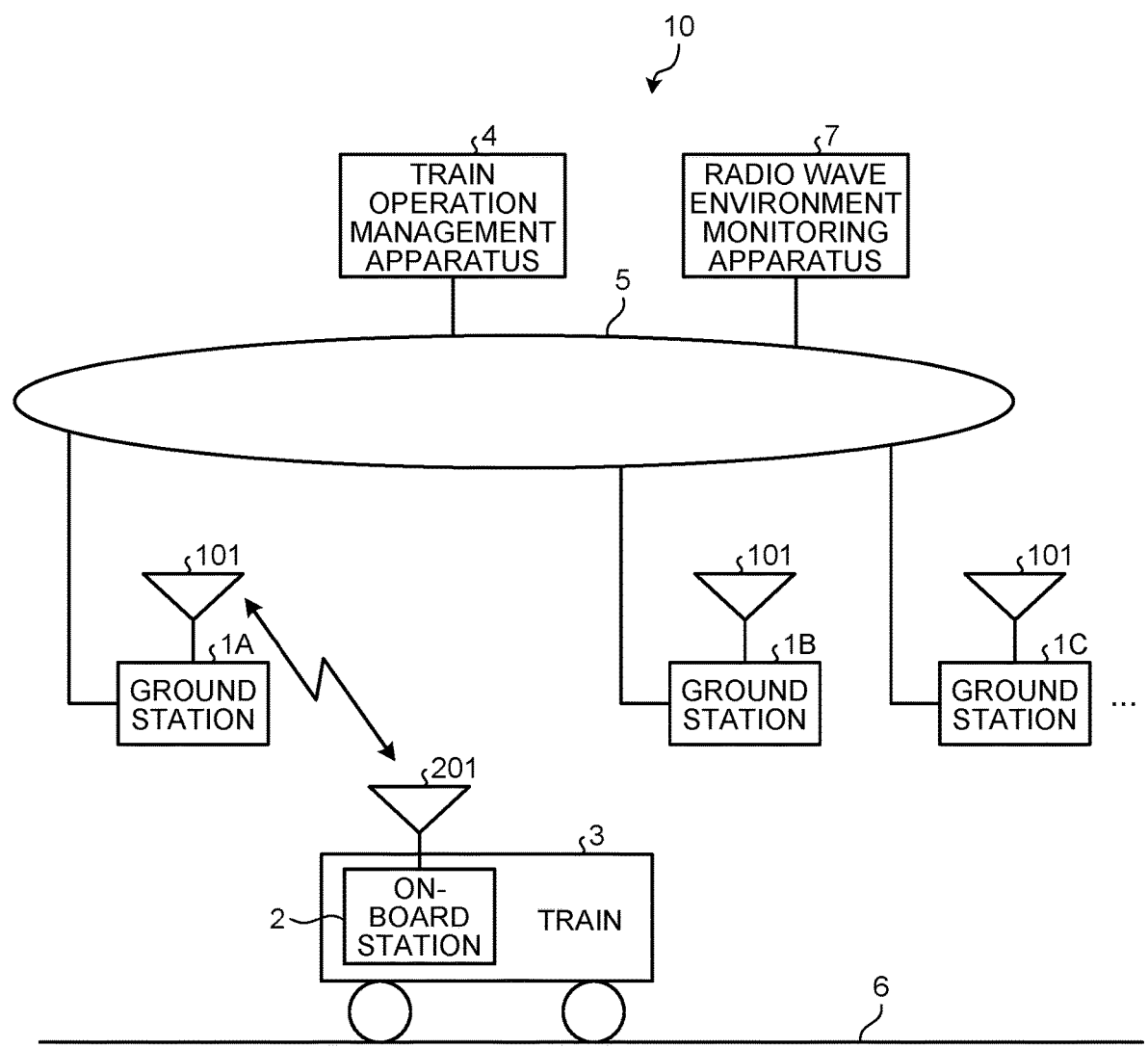
FIG. 1 is a diagram illustrating a configuration example of a wireless communication system according to a first embodiment.

FIG. 1 is a diagram illustrating a configuration example of a wireless communication system 10 according to a first embodiment. The wireless communication system 10 includes ground stations 1A, 1B, and 1C, a train 3, a train operation management apparatus 4, a wired network 5, and a radio wave environment monitoring apparatus 7.

The ground stations 1A to 1C are base stations installed along a track 6 for performing wireless communication with the train 3. The ground stations 1A to 1C are wireless communication apparatuses. The ground stations 1A to 1C are installed along the track 6 at intervals of, for example, some tens of meters to some hundreds of meters. When the ground stations 1A to 1C are not distinguished, each is sometimes referred to as the ground station 1. The ground station 1 includes an antenna 101 illustrated in FIG. 1. The train 3 runs on the track 6. The train 3 includes an on-board station 2. The on-board station 2 is a mobile station mounted on the train 3 to perform wireless communication with the ground station 1. The on-board station 2 is a wireless communication apparatus. For convenience of explanation, when a subject that transmits a data series is described as the train 3, the train 3 is a mobile station. The on-board station 2 includes an antenna 201 illustrated in FIG. 1.

The train operation management apparatus 4 is connected to the wired network 5 and manages the operation of trains 3 under control. Although only one train 3 is illustrated in FIG. 1, which is an example, the wireless communication system 10 can manage the operation of multiple trains 3. The wired network 5 is a wired network to which the ground stations 1, the train operation management apparatus 4, and the radio wave environment monitoring apparatus 7 are connected. The radio wave environment monitoring apparatus 7 collects radio wave environments measured by the ground stations 1 and the on-board station 2, and databases them.

In the wireless communication system 10, the ground stations 1 installed on the ground and the on-board station 2 mounted on the train 3 perform frequency-hopping wireless communication in which a frequency channel used is changed for each time slot. In the wireless communication system 10, the ground station 1 and the on-board station 2 transmit a data series on a frequency channel in a frequency hopping pattern corresponding to a radio resource time slot. In the following description, a time slot is sometimes simply referred to as a slot. In the wireless communication system 10, at least one of the ground station 1 and the on-board station 2 allocates radio resources. In the first embodiment, the ground station 1 allocates radio resources to the ground station 1 and the on-board station 2.

Figure 2:
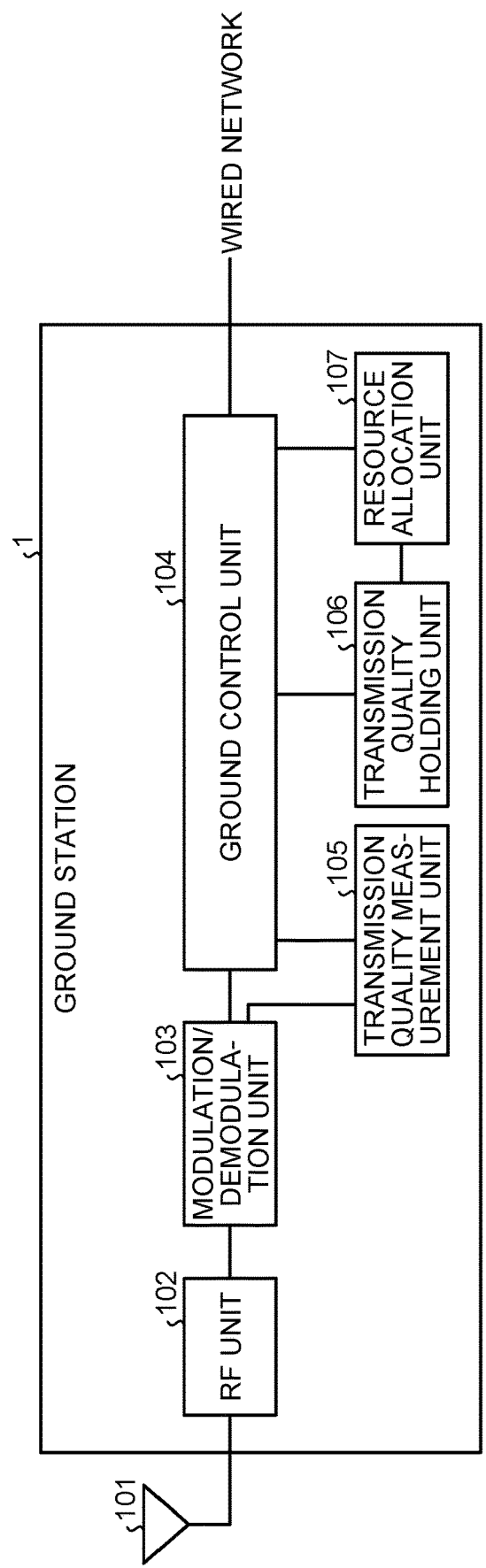
FIG. 2 is a block diagram illustrating a configuration example of a ground station according to the first embodiment.

The configuration of the ground station 1 will be described. FIG. 2 is a block diagram illustrating a configuration example of the ground station 1 according to the first embodiment. The ground station 1 includes the antenna 101, a radio-frequency (RF) unit 102, a modulation/demodulation unit 103, a ground control unit 104, a transmission quality measurement unit 105, a transmission quality holding unit 106, and a resource allocation unit 107.

The antenna 101 radiates a radio signal into the air at the time of transmission, and receives a radio signal propagating through the air. The RF unit 102 converts a digitally modulated signal into an analog signal, converts the frequency of the signal to a carrier frequency, and outputs the signal to the antenna 101 at the time of transmission, and converts the frequency of an analog signal received by the antenna 101 to a baseband and converts the signal into a digital signal at the time of reception. The modulation/demodulation unit 103 performs coding, modulation processing, etc. on a transmission data series at the time of transmission, and performs demodulation, decoding, etc. on a received signal at the time of reception. The ground control unit 104 is a control station that controls the transmission of a data series acquired from the wired network 5 at the time of transmission, and controls the output of a reception data series to the wired network 5 at the time of reception. When transmitting a data series, the ground control unit 104 controls the transmission of the data series using a radio resource, that is, a slot and a frequency channel allocated by the resource allocation unit 107. In the following description, a radio resource is sometimes simply referred to as a resource.

The transmission quality measurement unit 105 measures radio waves in a frequency band used by the ground station 1 during operation, that is, a frequency band used in the transmission of a data series, and evaluates the transmission quality of the ground station 1 based on the signal power value of a desired wave and the interference power value of an interfering wave or the like. The transmission quality holding unit 106 holds the power values measured by the transmission quality measurement unit 105, and information on the transmission quality of data series etc. collected by the radio wave environment monitoring apparatus 7. The resource allocation unit 107 performs resource allocation to a data series to be transmitted, based on a resource request from the ground control unit 104 and transmission quality information on each frequency channel held by the transmission quality holding unit 106. The details of the resource allocation in the resource allocation unit 107 will be described later.

Figure 3:
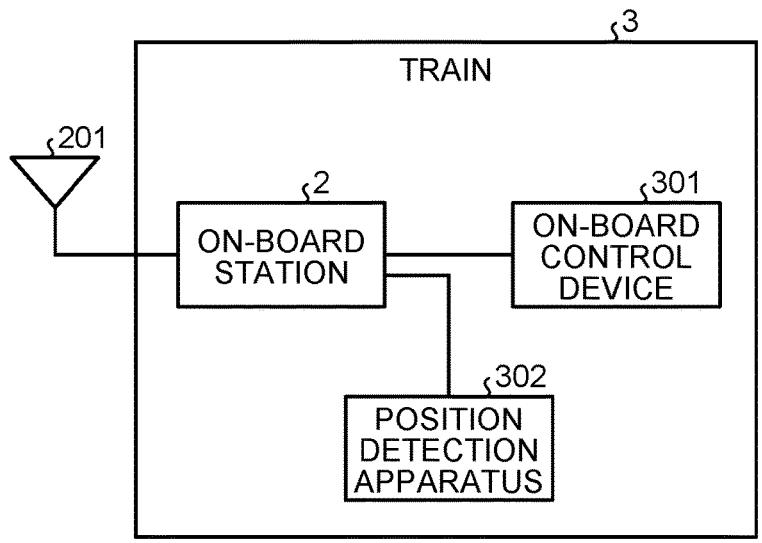
FIG. 3 is a block diagram illustrating a configuration example of a train according to the first embodiment.

The configuration of the train 3 will be described. FIG. 3 is a block diagram illustrating a configuration example of the train 3 according to the first embodiment. The train 3 includes the on-board station 2, an on-board control device 301, and a position detection apparatus 302. The on-board control device 301 controls the stop, change of speed, etc. of the train 3 based on a data series received by the on-board station 2. The position detection apparatus 302 detects the position of the train 3 and outputs position information to be transmitted to the train operation management apparatus 4 to the on-board station 2.

Figure 4:
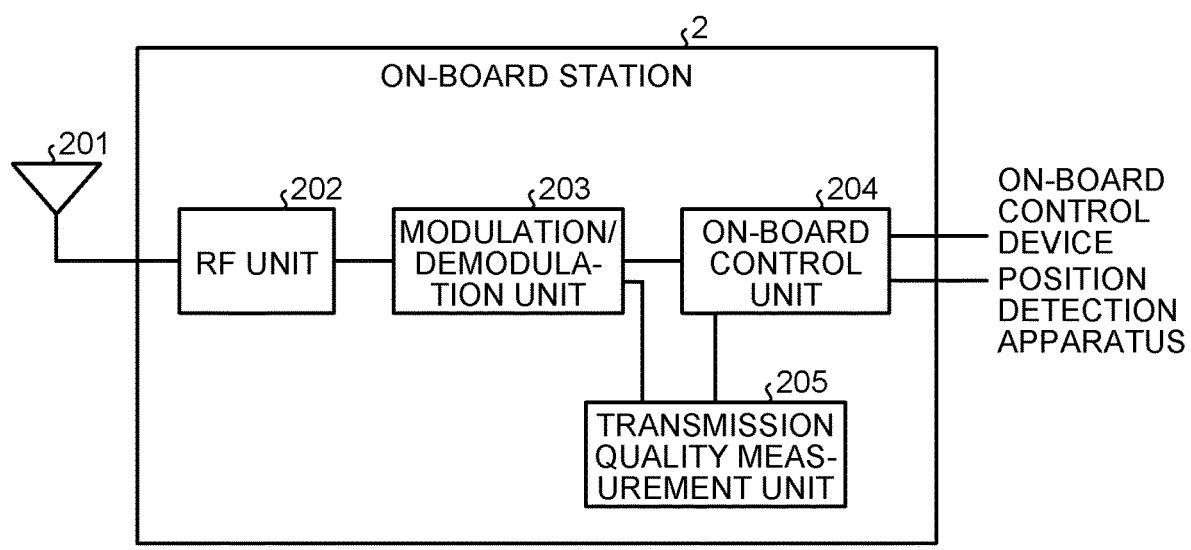
FIG. 4 is a block diagram illustrating a configuration example of an on-board station according to the first embodiment.

The configuration of the on-board station 2 will be described. FIG. 4 is a block diagram illustrating a configuration example of the on-board station 2 according to the first embodiment. The on-board station 2 includes the antenna 201, an RF unit 202, a modulation/demodulation unit 203, an on-board control unit 204, and a transmission quality measurement unit 205. The antenna 201, the RF unit 202, the modulation/demodulation unit 203, and the transmission quality measurement unit 205 have configurations similar to those of the antenna 101, the RF unit 102, the modulation/demodulation unit 103, and the transmission quality measurement unit 105 included in the ground station 1, respectively. The on-board control unit 204 is a control station that generates a transmission data series based on the position information from the position detection apparatus 302, and outputs the transmission data series to the modulation/demodulation unit 203 at the time of transmission, and outputs demodulated data output from the modulation/demodulation unit 203 to the on-board control device 301 at the time of reception.

Figure 5:
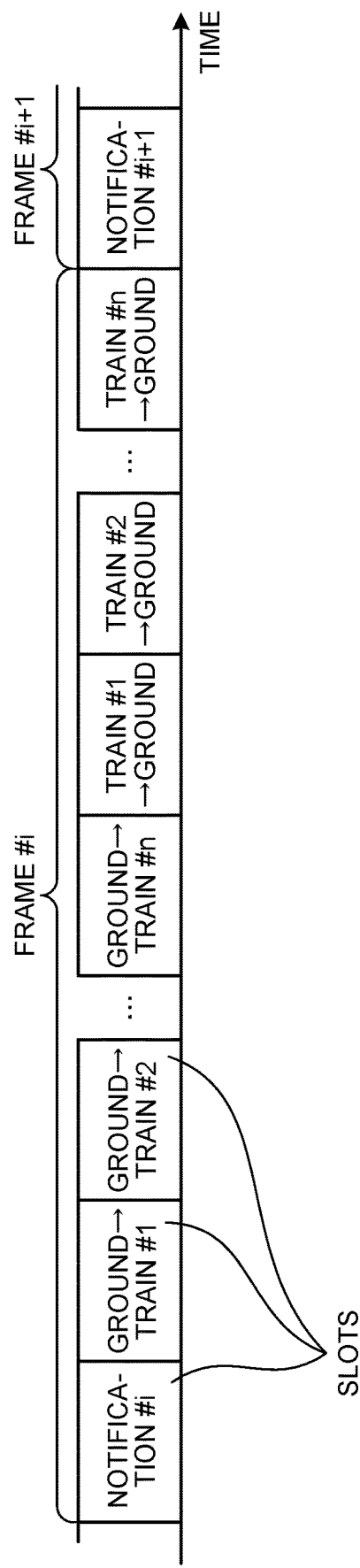
FIG. 5 is a diagram illustrating a configuration example of frames used in wireless communication between the on-board station and the ground station according to the first embodiment.

Next, the operation of the train operation management apparatus 4 to manage the operation of the train 3 in the wireless communication system 10 will be described. The on-board station 2 mounted on the train 3 running on the track 6 transmits and receives information by wireless communication to and from the ground stations 1A to 1C installed along the track 6. FIG. 5 is a diagram illustrating a configuration example of frames used in wireless communication between the on-board station 2 and the ground stations 1A to 1C according to the first embodiment. In FIG. 5, each frame is composed of slots of a fixed time length. The first slot of the frame is a slot in which notification information is stored. The notification information includes information to be transmitted from the ground station 1 to all trains 3 in the cell. The information to be transmitted is, for example, information necessary to generate a frame hopping pattern, a frame number, a cell number, slot allocation information, etc. In the frame illustrated in FIG. 5, after the slot in which the notification information is stored, the same number of slots as that of trains 3 that can be accommodated by or connected to the ground station 1 are arranged for transmitting information such as a stop limit position from the ground station 1 to the individual trains 3 in the cell. In the frame illustrated in FIG. 5, after the slots for transmitting information from the ground station 1 to the trains 3, the same number of slots as that of trains 3 that can be accommodated by or connected to the ground station 1 are arranged for transmitting position information on the trains 3 from the trains 3 to the ground station 1.

When receiving the notification information in the frame head, the on-board station 2 grasps a slot and a hopping pattern allocated to the train 3 on which the station is mounted. Here, the frequency channel of the notification information slot itself may be generated from the hopping pattern information in the notification information in the previous frame, or the hopping pattern information itself may be defined as information for the next frame. Instead of including the hopping pattern in the notification information, the ground station 1 may transmit information on the hopping pattern to the on-board station 2 when the on-board station 2 connects to the ground station 1, or a hopping pattern determined in advance for each ground station 1 may be held by the on-board station 2. The allocation information is used in, for example, dynamic allocation for transmission of information occurring non-stationarily such as transmission of video from a surveillance camera. For transmission of stationary information such as train control information, it is assumed that a fixed slot is allocated when the on-board station 2 connects to the ground station 1.

The on-board station 2 transmits the position information output from the position detection apparatus 302 at regular intervals to the ground station 1 in a slot to which the train 3 on which the station is mounted is allocated. Examples of a method of detecting the position of the train 3 in the position detection apparatus 302 include a method using the Global Positioning System (GPS), and a calculation method using starting point position information transmitted from a wayside coil to a pickup coil and a travel distance obtained from a tacho-generator that measures the axle rotation speed.

The position information sent from the trains 3 is collected in the train operation management apparatus 4 via the ground stations 1 and the wired network 5. Based on the position information on the trains 3, the train operation management apparatus 4 calculates a stop limit position for each train 3 which is a limit position at which the train 3 can safely stop without colliding with a preceding train. The train operation management apparatus 4 outputs the calculated stop limit position to the ground station 1 accommodating the train 3 via the wired network 5.

The ground station 1 transmits the stop limit position to each train 3 accommodated by the station in a slot allocated to the train 3. In the train 3 that has received the stop limit position, the on-board control device 301 calculates an operating speed to ensure a stop at the stop limit position, and controls the speed of the train 3 according to the calculated operating speed.

In the wireless communication system 10, the above exchange of the position information and the stop limit position is performed between the train operation management apparatus 4 on the ground and the train 3 in a fixed cycle of about some hundreds of milliseconds, so that the stop limit position is updated in this cycle, allowing the operation of the train 3. If the update of the stop limit position is interrupted due to some anomaly, the train 3 performs speed control to stop. When the train 3 moves and approaches the cell of an adjacent ground station 1, the on-board station 2 performs handover processing to change the ground station 1 to communicate with. Information transmitted between the ground station 1 and the on-board station 2 need not be limited to information related to train control. For example, video from a surveillance camera, information on automatic driving, audio information, etc. may be transmitted. FIG. 5 illustrates an example in which slots are allocated to each of n trains 3. If only one train 3 is located in the area or on the rails in the cell, for example, allocation may be dynamically changed such that all slots are allocated to the train 3.

Figure 6:
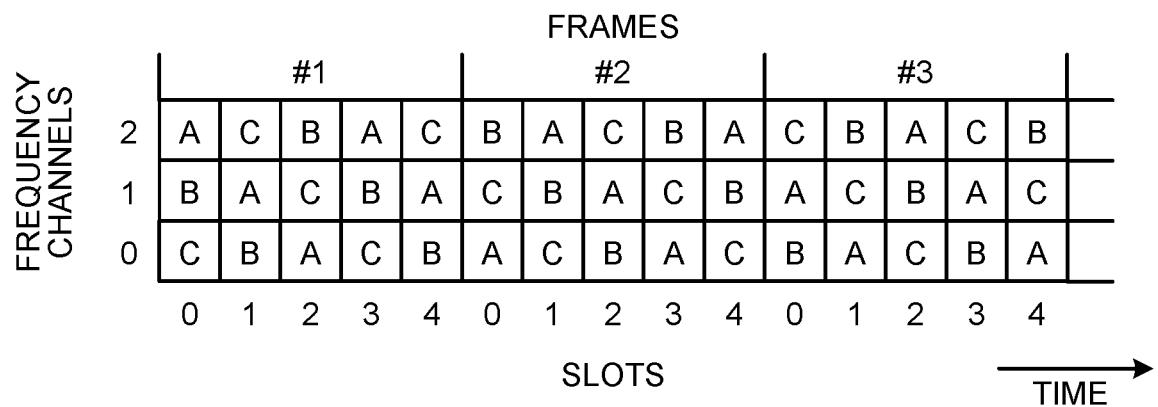
FIG. 6 is a diagram illustrating an example of the relationship between frequency channels used by the ground stations and slots of each frame according to the first embodiment.

Next, frequency channel switching control when the frames illustrated in FIG. 5 are wirelessly transmitted between the ground station 1 and the on-board stations 2 will be described. FIG. 6 is a diagram illustrating an example of the relationship between frequency channels used by the ground stations 1 and the slots of each frame according to the first embodiment. In FIG. 6, the horizontal axis represents time, and the vertical axis represents the frequency channels. In FIG. 6, as an example, the number of frequency channels is three, and the number of slots in a frame is five. In FIG. 6, for ease of explanation, the notification information slot and the train→ground slots illustrated in FIG. 5 are omitted, and all are ground→train slots. In FIG. 6, A, B, and C indicate frequency channels to be used corresponding to the ground stations 1A, 1B, and 1C, respectively. In the first embodiment, the wireless communication system 10 applies frequency hopping, and the ground stations 1A to 1C change frequency channels to be used for each slot. Different frequency channels to be used by the ground stations 1 are arranged in the same slot to avoid interference between the cells of the ground stations 1. Therefore, if one ground station 1 uses a frequency channel different from a frequency channel based on a predetermined hopping pattern because the transmission quality of a specific frequency channel is not good, it can cause interference with the cell of another ground station 1, degrading the transmission quality.

Figure 7:
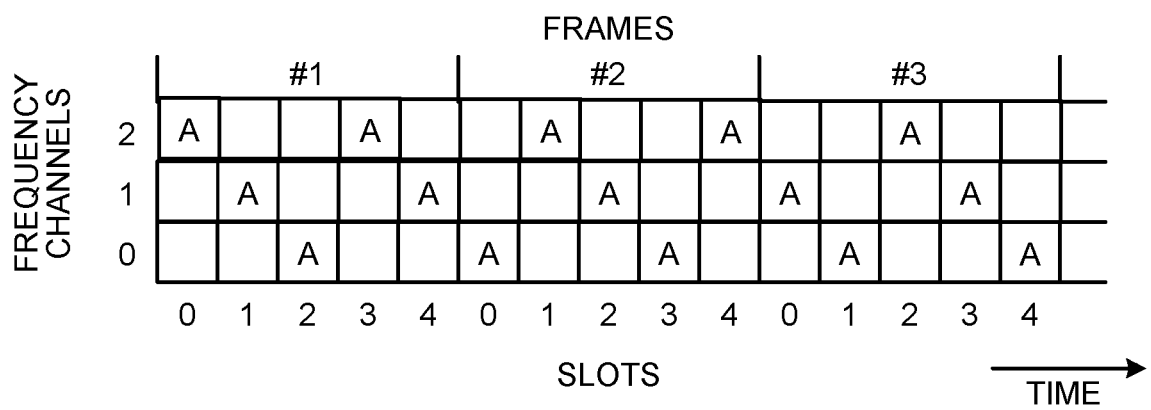
FIG. 7 is a diagram illustrating resources used by the ground station according to the first embodiment.

FIG. 7 is a diagram illustrating resources to be used by the ground station 1A according to the first embodiment. The resources to be used by the ground station 1A illustrated in FIG. 7 are resources to be used by the ground station 1A extracted from resources to be used by the ground stations 1A to 1C illustrated in FIG. 6. In the first embodiment, the ground station 1A performs resource allocation to a data series to be transmitted, using only resources indicated by A in FIG. 7.

In the first embodiment, the resource allocation unit 107 changes a resource to be used depending on transmission quality based on the radio wave environment. The transmission quality measurement unit 105 of the ground station 1 and the transmission quality measurement unit 205 of the on-board station 2 constantly measure the radio wave environment during operation. The transmission quality measurement unit 105 and the transmission quality measurement unit 205 measure the power of a received desired signal as a signal power value, and measure the power of a received radio wave during a period when no communication is performed as an interference power value. The ground station 1 transmits data measured by the transmission quality measurement unit 105 to the radio wave environment monitoring apparatus 7 via the wired network 5 to aggregate the data in the radio wave environment monitoring apparatus 7. The on-board station 2 transmits data measured by the transmission quality measurement unit 205 to the radio wave environment monitoring apparatus 7 via the ground station 1 and the wired network 5, to aggregate the data in the radio wave environment monitoring apparatus 7. The radio wave environment monitoring apparatus 7 averages the measured data and evaluates transmission quality. For example, the radio wave environment monitoring apparatus 7 calculates a signal power-to-interference power ratio for each ground station 1 and each frequency channel, and performs classification according to the value of the signal power-to-interference power ratio.

Figures 8, 9:
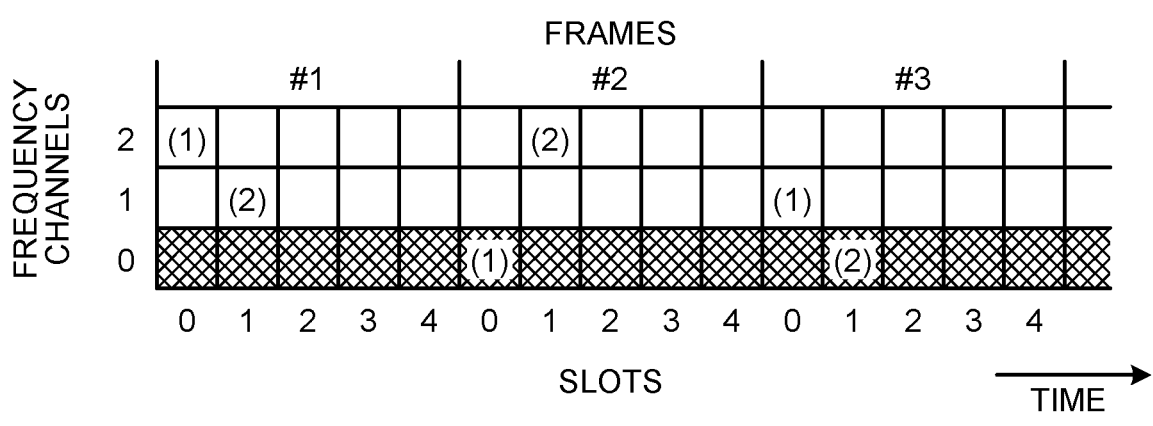
FIG. 8 is a diagram illustrating an example of evaluation values of transmission quality classified in a radio wave environment monitoring apparatus according to the first embodiment.
FIG. 9 is a diagram illustrating an example of resource allocation to trains in a resource allocation unit of the ground station and the transmission quality of the frequency channels according to the first embodiment.

FIG. 8 is a diagram illustrating an example of evaluation values of transmission quality classified in the radio wave environment monitoring apparatus 7 according to the first embodiment. The transmission quality evaluation values illustrated in FIG. 8 show an example of classification in four levels, 0, 1, 2, and 3, for each ground station 1 and each frequency channel. In FIG. 8, a transmission error rate of $10^{-3}$ or less is associated with evaluation value 3, a transmission error rate of more than $10^{-3}$ and less than or equal to $10^{-2}$ with evaluation value 2, a transmission error rate of more than $10^{-2}$ and less than or equal to $10^{-1}$ with evaluation value 1, and a transmission error rate of more than $10^{-1}$ with evaluation value 0. In the example of FIG. 8, evaluation value 3 represents little interference and the best transmission quality, evaluation value 2 represents moderate interference and the best transmission quality next to evaluation value 3, evaluation value 1 represents moderate interference and the best transmission quality next to evaluation value 2, and evaluation value 0 represents much interference and the worst transmission quality. The radio wave environment monitoring apparatus 7 may evaluate the transmission quality based only on the strength of the interference power, instead of on the signal power-to-interference power ratio.

When averaging measured data, the radio wave environment monitoring apparatus 7 may use measured data at regular intervals for averaging, or use a forgetting factor to increase the influence of the latest measured data for averaging. The radio wave environment monitoring apparatus 7 may perform classification in more than four levels of evaluation value, or may evaluate transmission quality for each smaller area instead of each ground station 1. The radio wave environment monitoring apparatus 7 may separate data measured by the ground station 1 and data measured by the on-board station 2 to evaluate transmission quality. The radio wave environment monitoring apparatus 7 delivers the calculated transmission quality evaluation value to the ground station 1 at regular intervals. In the ground station 1, the transmission quality holding unit 106 holds the delivered transmission quality evaluation value as transmission quality information. The resource allocation unit 107 refers to the transmission quality evaluation value held in the transmission quality holding unit 106 at the time of resource allocation. In the ground station 1, the transmission quality holding unit 106 may hold data on signal power and interference power measured by the transmission quality measurement unit 105.

FIG. 9 is a diagram illustrating an example of resource allocation to trains 3 in the resource allocation unit 107 of the ground station 1A and the transmission quality of the frequency channels according to the first embodiment. FIG. 9 illustrates an example of resource allocation when two trains 3 are located in the area or on the rails in the cell of the ground station 1A. FIG. 9 illustrates frames in each of which a train (1) is allocated to a slot 0, and a train (2) is allocated to a slot 1. When connecting to the ground station 1 through handover, each train 3 is notified of allocation information as illustrated in FIG. 9 by the ground station 1, and can grasp the number of a slot in which to transmit. FIG. 9 also illustrates how the radio wave environment of each frequency channel is. FIG. 9 illustrates that a frequency channel 0 is in an environment of evaluation value 0, that is, has strong interference power and is of poor transmission quality, and frequency channels 1 and 2 are in an environment of evaluation value 3, that is, have weak interference power and are of good transmission quality.

Figure 10:
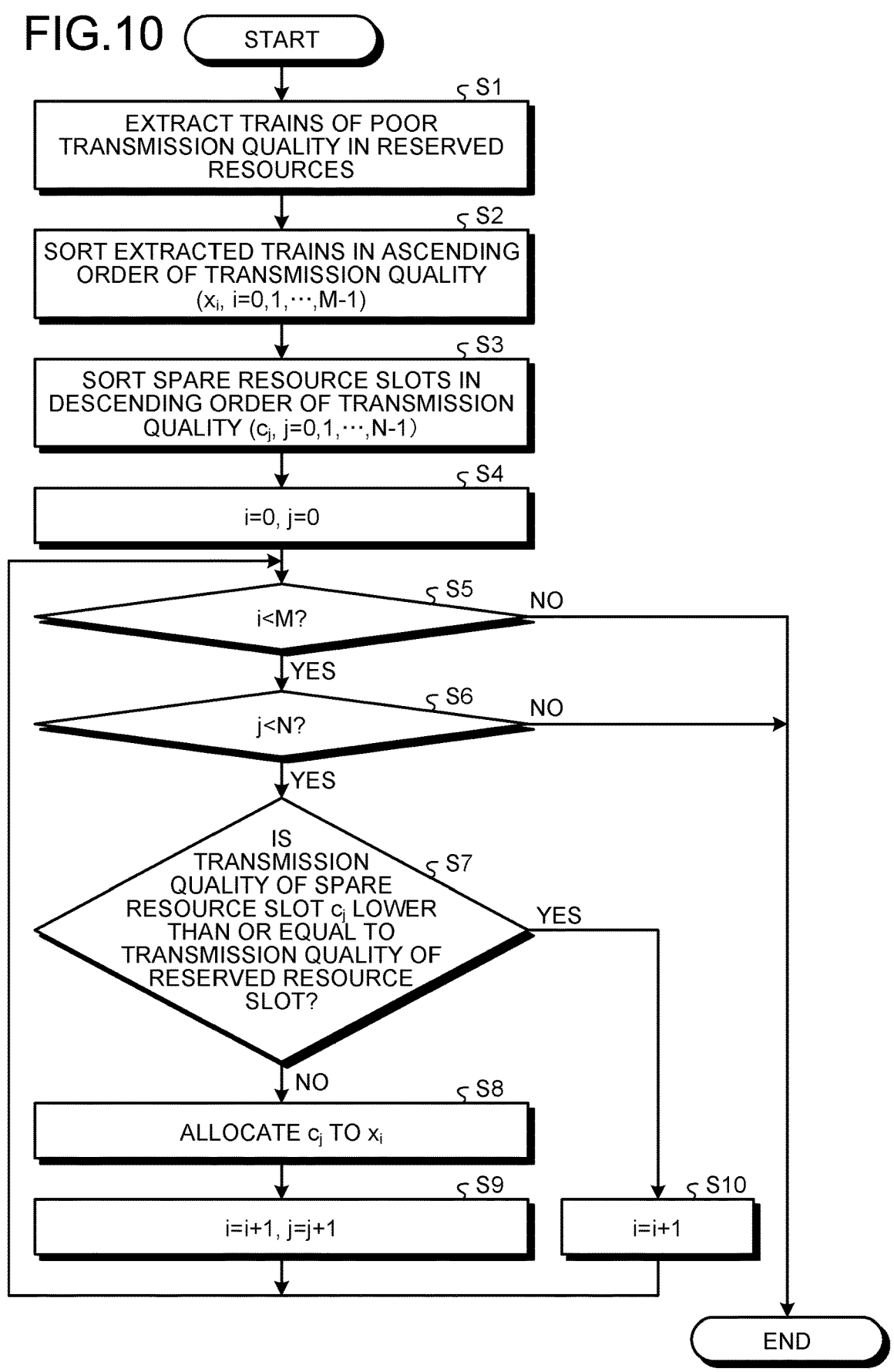
FIG. 10 is a flowchart illustrating a resource allocation operation of the resource allocation unit of the ground station according to the first embodiment.

Resource allocation operation by the resource allocation unit 107 of the ground station 1A will be described with reference to a flowchart. FIG. 10 is a flowchart illustrating the resource allocation operation of the resource allocation unit 107 of the ground station 1A according to the first embodiment. The resource allocation unit 107 starts the resource allocation operation according to an instruction from the ground control unit 104.

First, the resource allocation unit 107 extracts a train 3 that uses a slot of poor transmission quality in reserved resources (step S1). For example, the resource allocation unit 107 determines that a slot of transmission quality lower than or equal to a threshold value is a slot of poor transmission quality. The threshold value is, for example, transmission quality evaluation value 2 illustrated in FIG. 8. In this case, the resource allocation unit 107 determines that slots of evaluation value 3 representing the best transmission quality are of good transmission quality, and determines that slots other than the slots of evaluation value 3 representing the best transmission quality, that is, slots of evaluation value 2 or less are all of poor transmission quality.

Figure 11:
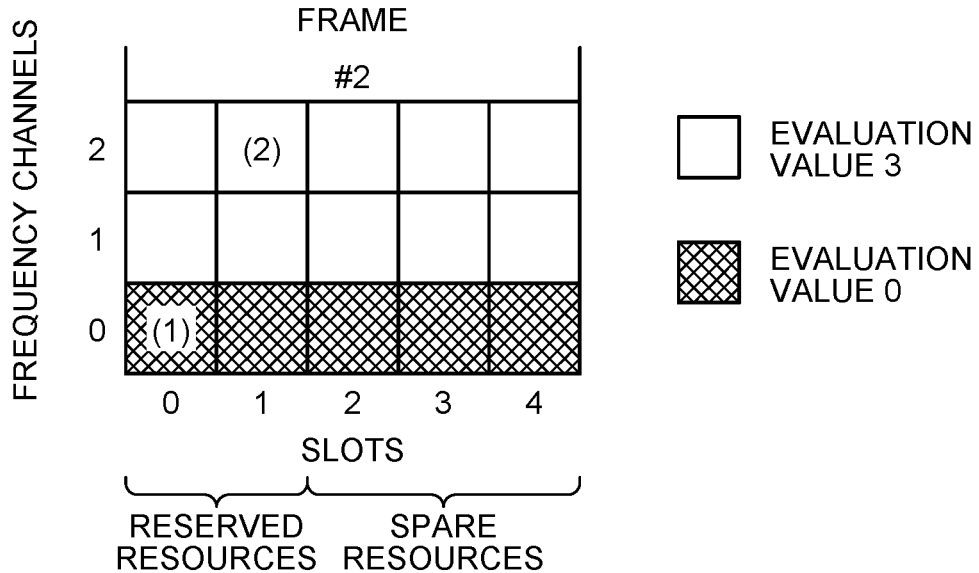
FIG. 11 is a diagram illustrating a configuration example of a frame according to the first embodiment.

Here, the configuration of the slots of each frame will be described. FIG. 11 is a diagram illustrating a configuration example of a frame according to the first embodiment. A frame #2 illustrated in FIG. 11 is a frame #2 extracted from the frames illustrated in FIG. 9. Here, the two trains 3 are located in the area or on the rails of the ground station 1A. FIG. 11 illustrates that in the frame #2 consisting of five slots, the first two slots 0 and 1 are allocated as reserved resources for the two trains 3, and the remaining three slots 2 to 4 are allocated as spare resources. That is, radio resources in each frame include reserved resources that are time slots fixedly allocated to the trains 3 located in the cell that is the communication range of the ground station 1, and spare resources that are time slots that can be allocated to the trains 3 located in the cell. The resource allocation unit 107 extracts the train (1) because the transmission quality of the train (1) allocated to the slot 0 of the reserved resources is poor. In the example of FIG. 11, M=1, where M represents the number of trains 3 extracted in step S1.

The resource allocation unit 107 sorts trains 3 extracted in step S1 in ascending order of transmission quality (step S2). In the example of FIG. 11, the resource allocation unit 107 does not perform particular processing because only the train (1) is a train 3 of poor transmission quality. The resource allocation unit 107 sorts the spare resource slots in descending order of transmission quality (step S3). In the example of FIG. 11, the slots 2, 3, and 4 are spare resources. When checked against those in FIG. 7, the slots 2 and 4 are of evaluation value 3, and the slot 3 is of evaluation value 0. Thus, the resource allocation unit 107 sorts them in the order of the slots 2, 4, and 3. In the example of FIG. 11, N=3, where N represents the number of spare resource slots. The resource allocation unit 107 initializes a parameter i indicating the number M of trains 3 extracted in step S1 to i=0, and initializes a parameter j indicating the number N of spare resource slots to j=0 (step S4).

The resource allocation unit 107 determines whether or not the parameter i indicating the number M of extracted trains 3 is i<M (step S5). Step S5 is operation for the resource allocation unit 107 to determine whether or not the spare resource slot allocation to all the extracted trains 3 has been completed. If i<M (step S5: Yes), the resource allocation unit 107 determines whether or not the parameter j indicating the number N of spare resource slots is j<N (step S6). Step S6 is operation for the resource allocation unit 107 to determine whether or not the allocation of all the spare resource slots has been completed. If j<N (step S6: Yes), the resource allocation unit 107 determines whether or not the transmission quality of a spare resource slot $c_j$ is lower than or equal to the transmission quality of a reserved resource slot allocated to a train $x_i$ (step S7).

If the transmission quality of the spare resource slot $c_j$ is better than the transmission quality of the reserved resource slot allocated to the train $x_i$ (step S7: No), the resource allocation unit 107 allocates the spare resource slot cl to the train $x_i$ (step S8). The resource allocation unit 107 increments the parameters i and j individually, that is, sets i=i+1 and j=j+1 (step S9). The resource allocation unit 107 returns to the operation in step S5. If the transmission quality of the spare resource slot $c_j$ is lower than or equal to the transmission quality of the reserved resource slot allocated to the train $x_i$ (step S7: Yes), the resource allocation unit 107 increments the parameter i, that is, sets i=i+1 (step S10). The resource allocation unit 107 returns to the operation in step S5.

If i≥M (step S5: No), the resource allocation unit 107 determines that the allocation of spare resource slots to all the extracted trains 3 has been completed, and finishes the operation. If j≥N (step S6: No), the resource allocation unit 107 determines that the allocation of all the spare resource slot has been completed, and finishes the operation. In this way, to the on-board station 2 of a train 3 that is lower than or equal to the threshold value in the transmission quality of the frequency channel used in the reserved resource time slot, the resource allocation unit 107 allocates, of the spare resource time slots, a time slot that improves frequency channel transmission quality.

Figure 12:
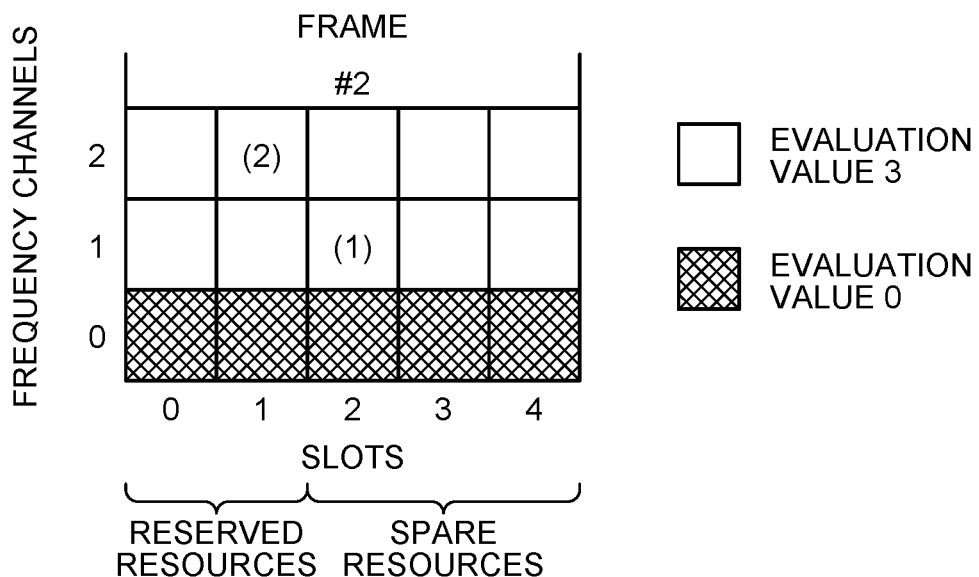
FIG. 12 is a diagram illustrating an example in which the resource allocation unit of the ground station allocates a spare resource slot to a train whose reserved resource slot is of poor transmission quality according to the first embodiment.

By performing the operation of the flowchart illustrated in FIG. 10, the resource allocation unit 107 can allocate slots of good transmission quality sorted in descending order in step S3 to trains 3 of poor transmission quality sorted in ascending order in step S2 sequentially. FIG. 12 is a diagram illustrating an example in which the resource allocation unit 107 of the ground station 1 according to the first embodiment allocates a spare resource slot to a train 3 whose reserved resource slot is of poor transmission quality. Specifically, by performing the operation of the flowchart illustrated in FIG. 10, the resource allocation unit 107 allocates the train (1) allocated to the reserved resource slot 0 in FIG. 11 to the spare resource slot 2. As illustrated in FIG. 12, the resource allocation unit 107 can allocate both of the trains (1) and (2) to frequency channels of good transmission quality.

Figures 13, 14:
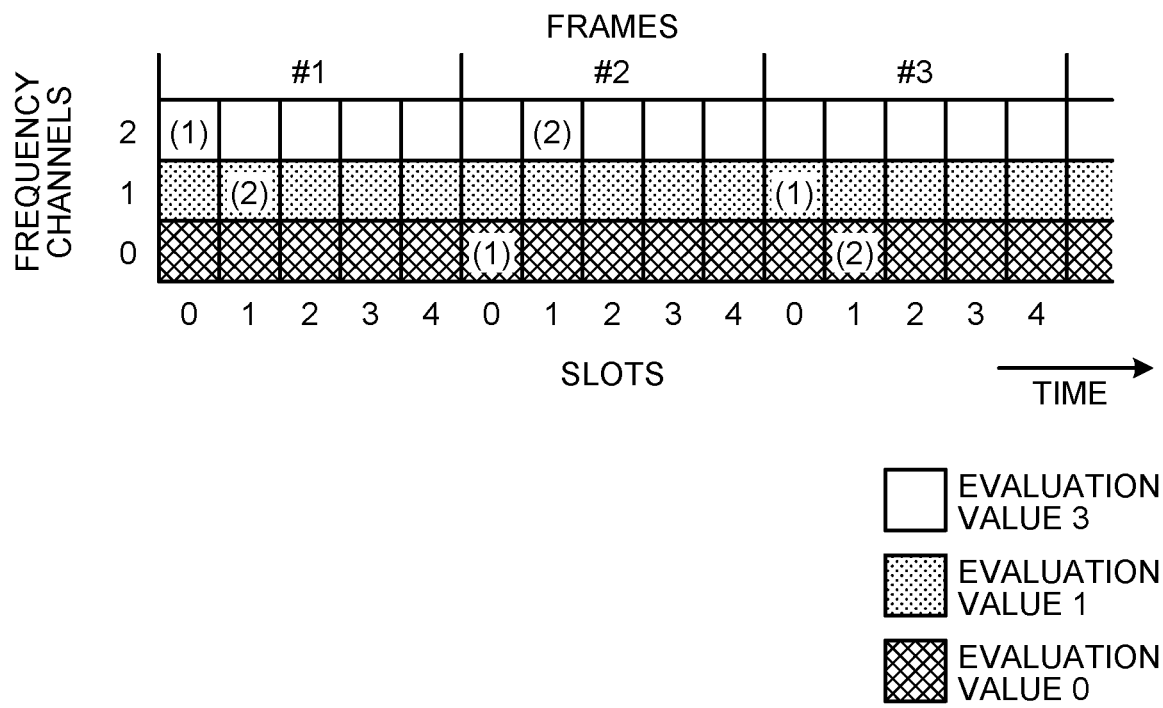
FIG. 13 is a diagram illustrating an example when the ground station transmits slot allocation information in notification information to the on-board stations of the trains according to the first embodiment.
FIG. 14 is a diagram illustrating another example of resource allocation to the trains in the resource allocation unit of the ground station and the transmission quality of the frequency channels according to the first embodiment.

FIG. 13 is a diagram illustrating an example when the ground station 1 transmits slot allocation information in notification information to the on-board stations 2 of the trains 3 according to the first embodiment. The slot allocation information illustrated in FIG. 13 indicates that the train (1) is allocated to the slot 2. That is, the slot allocation information illustrated in FIG. 13 can be said to be spare resource allocation information. The ground station 1 that allocates radio resources notifies the trains 3 of radio resource allocation information like the slot allocation information illustrated in FIG. 13. If the train (1) can receive the notification information including the slot allocation information illustrated in FIG. 13, the train (1) transmits a data series to the ground station 1 using the slot 2 in the frame #2. On the other hand, if the train (1) cannot receive the notification information including the slot allocation information illustrated in FIG. 13, the train (1) transmits a data series to the ground station 1 using the originally reserved slot 0. That is, each train 3 transmits a data series using a spare resource time slot if spare resource allocation information is obtained, or using a reserved resource time slot if spare resource allocation information is not obtained.

A case with transmission quality different from that in FIG. 9 will be further described. FIG. 14 is a diagram illustrating another example of resource allocation to the trains 3 in the resource allocation unit 107 of the ground station 1A and the transmission quality of the frequency channels according to the first embodiment. In FIG. 14, the allocation of the trains (1) and (2) to slots in each frame is the same as that in FIG. 9, but the transmission quality of the frequency channel 1 is evaluation value 1, which is lower than that in FIG. 9.

The operation of the resource allocation unit 107 will be described using a frame #3 in FIG. 14 as an example, with reference to the flowchart in FIG. 10. First, the resource allocation unit 107 extracts a train of poor transmission quality in reserved resources (step S1). In the example of FIG. 14, the resource allocation unit 107 extracts the trains (1) and (2) of poor transmission quality. Here, the number of extracted trains 3 is M=2. The resource allocation unit 107 sorts the trains 3 extracted in step S1 in ascending order of transmission quality (step S2). In the example of FIG. 14, the resource allocation unit 107 sorts them in the order of the trains (2) and (1). The resource allocation unit 107 sorts the spare resource slots in descending order of transmission quality (step S3). In the example of FIG. 14, the resource allocation unit 107 sorts them in the order of the slots 2, 3, and 4. Here, the number of spare resource slots is N=3.

The resource allocation unit 107 allocates the train (2) to the slot 2 in the first loop from step S5 to step S10. In the second loop from step S5 to step S10, the resource allocation unit 107 considers the allocation of the train (1) to the slot 3, but in step S7, the transmission quality of the spare resource slot $c_j$ is lower than or equal to the transmission quality of the reserved resource slot allocated to the train $x_i$ (step S7: Yes), and thus the resource allocation unit 107 does not perform new allocation and proceeds to step S10. Since i≥M (step S5: No), the resource allocation unit 107 determines that the allocation of spare resource slots to all the extracted trains 3 has been completed and finishes the operation.

Figures 15, 16:
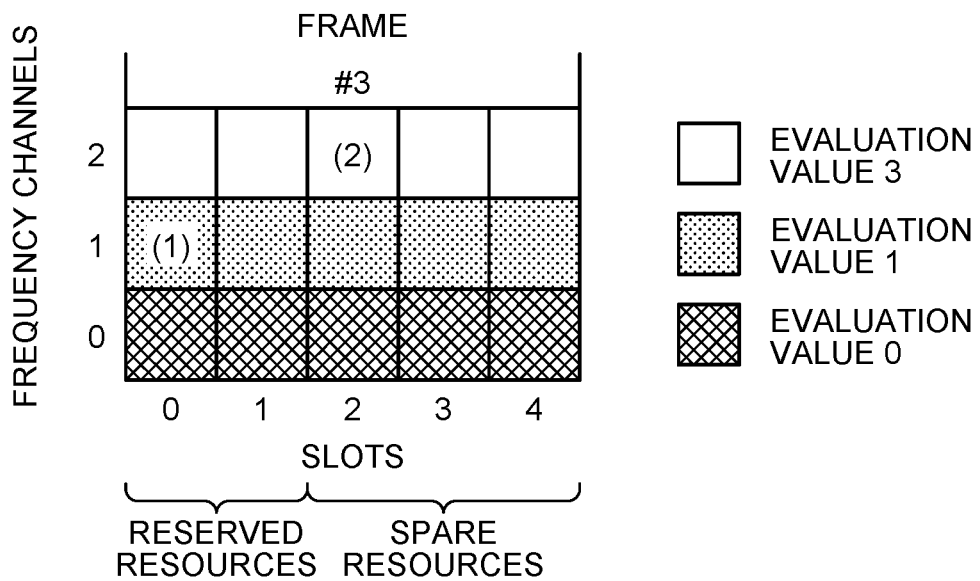
FIG. 15 is a diagram illustrating another example in which the resource allocation unit of the ground station allocates a spare resource slot to a train whose reserved resource slot is of poor transmission quality according to the first embodiment.
FIG. 16 is a diagram illustrating another example when the ground station transmits slot allocation information in notification information to the on-board stations of the trains according to the first embodiment.

FIG. 15 is a diagram illustrating another example in which the resource allocation unit 107 of the ground station 1 allocates a spare resource slot to a train 3 whose reserved resource slot is of poor transmission quality according to the first embodiment. Specifically, by performing the operation of the flowchart illustrated in FIG. 10, the resource allocation unit 107 allocates the train (2) allocated to the reserved resource slot 1 in FIG. 14 to the spare resource slot 2. As illustrated in FIG. 15, the resource allocation unit 107 can allocate the train (2) to a frequency channel of better transmission quality than in FIG. 14.

FIG. 16 is a diagram illustrating another example when the ground station 1 transmits slot allocation information in notification information to the on-board stations 2 of the trains 3 according to the first embodiment. The slot allocation information illustrated in FIG. 16 indicates that the train (2) is allocated to the slot 2. If the train (2) can receive the notification information including the slot allocation information illustrated in FIG. 16, the train (2) transmits a data series to the ground station 1 using the slot 2 in the frame #3. On the other hand, if the train (2) cannot receive the notification information including the slot allocation information illustrated in FIG. 16, the train (2) transmits a data series to the ground station 1 using the originally reserved slot 1.

As described above, according to the first embodiment, the ground station 1 divides radio resources in each frame into reserved resources and spare resources without changing a predetermined frequency hopping pattern, and preferentially allocates a train 3 allocated to a slot of poor transmission quality in the reserved resources to a slot of good transmission quality among the spare resource slots. Consequently, the wireless communication system 10 prevents a signal from a certain ground station 1 or on-board station 2 from interfering with another cell, and prevents data transmissions of on-board stations 2 from colliding with each other, allowing higher quality and more stable wireless transmission. Even if spare resource reallocation information is not obtained from the ground station 1, the on-board station 2 can continue wireless transmission by using the original reserved resource.

Second Embodiment

In the first embodiment, the ground station 1 performs radio resource allocation. In the second embodiment, on-board stations perform radio resource allocation. Differences from the first embodiment will be described.

Figure 17:
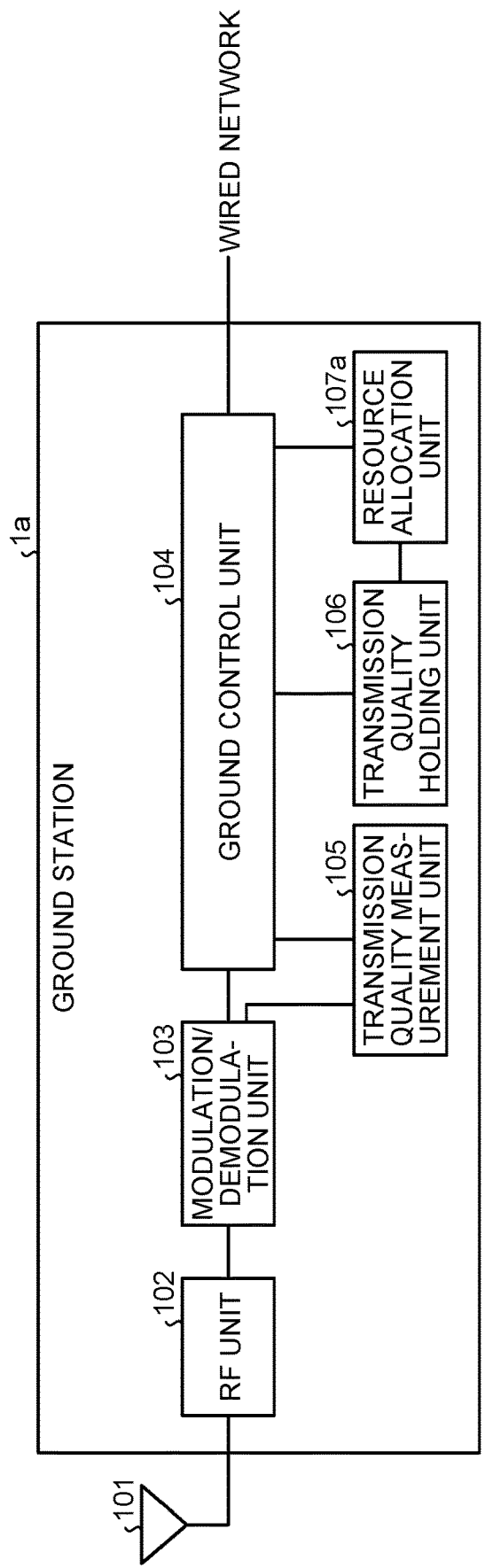
FIG. 17 is a block diagram illustrating a configuration example of a ground station according to a second embodiment.

FIG. 17 is a block diagram illustrating a configuration example of a ground station 1a according to the second embodiment. Compared to the ground station 1 of the first embodiment illustrated in FIG. 2, the ground station 1a includes a resource allocation unit 107a in the place of the resource allocation unit 107. The resource allocation unit 107a does not perform the processing as in the flowchart illustrated in FIG. 10, but simply allocates radio resources to on-board stations according to reserved resources.

Figure 18:
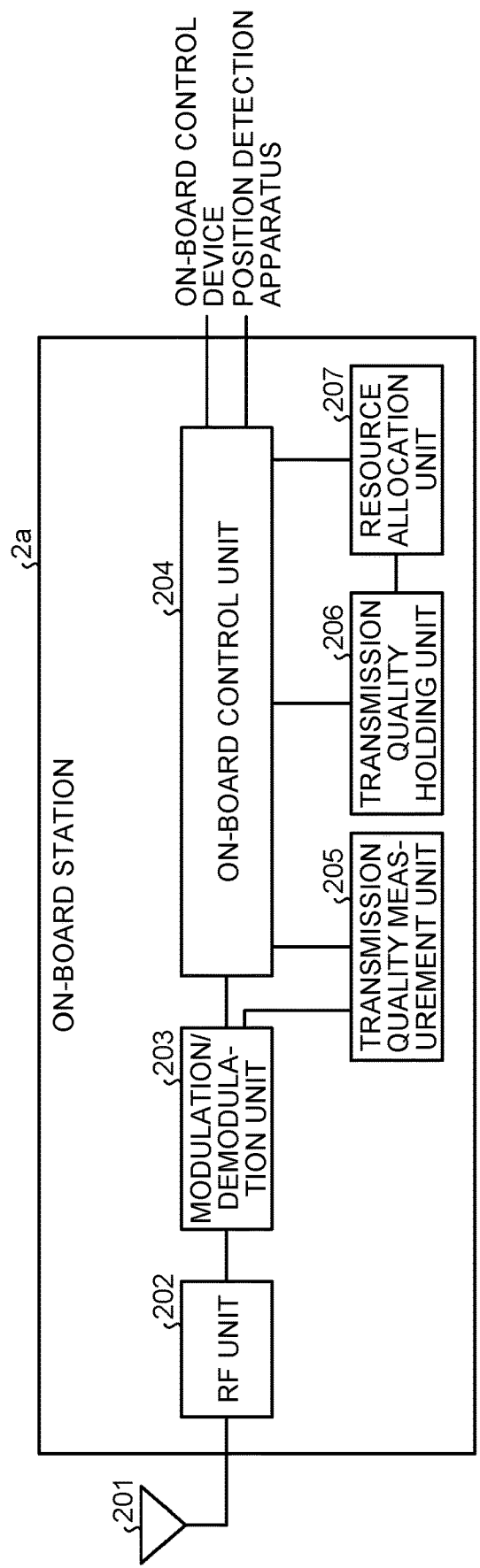
FIG. 18 is a block diagram illustrating a configuration example of an on-board station according to the second embodiment.

FIG. 18 is a block diagram illustrating a configuration example of an on-board station 2a according to the second embodiment. Compared to the on-board station 2 of the first embodiment illustrated in FIG. 4, the on-board station 2a additionally includes a transmission quality holding unit 206 and a resource allocation unit 207. The transmission quality holding unit 206 and the resource allocation unit 207 have functions similar to those of the transmission quality holding unit 106 and the resource allocation unit 107 of the ground station 1 in the first embodiment illustrated in FIG. 2.

In the second embodiment, the ground station 1a notifies the on-board station 2a of notification information including transmission quality information and reserved resource information. The on-board station 2a performs radio resource allocation using the information acquired from the ground station 1a. FIG. 19 is a diagram illustrating an example of the transmission quality information of which the ground station 1a according to the second embodiment notifies the on-board station 2a in the notification information. FIG. 19 illustrates the respective evaluation values of the frequency channels under the radio wave environments in FIG. 14. The on-board station 2a causes the transmission quality holding unit 206 to hold the transmission quality information acquired from the ground station 1a. The resource allocation unit 207 refers to the transmission quality information held in the transmission quality holding unit 206 to perform radio resource allocation. FIG. 20 is a diagram illustrating an example of the reserved resource information of which the ground station 1a according to the second embodiment notifies the on-board station 2a in the notification information. FIG. 20 illustrates that two trains 3 are connected to the ground station 1a, and the number of reserved resources is two. The ground station 1a notifies the trains 3 of the notification information including the transmission quality information and the reserved resource information. In the second embodiment, the on-board station 2a of each train 3 allocates a radio resource used by the station, that is, the on-board station 2a based on a specified rule, using the notification information. The ground station 1a allocates a radio resource to the station, that is, the ground station 1a.

Figure 21:
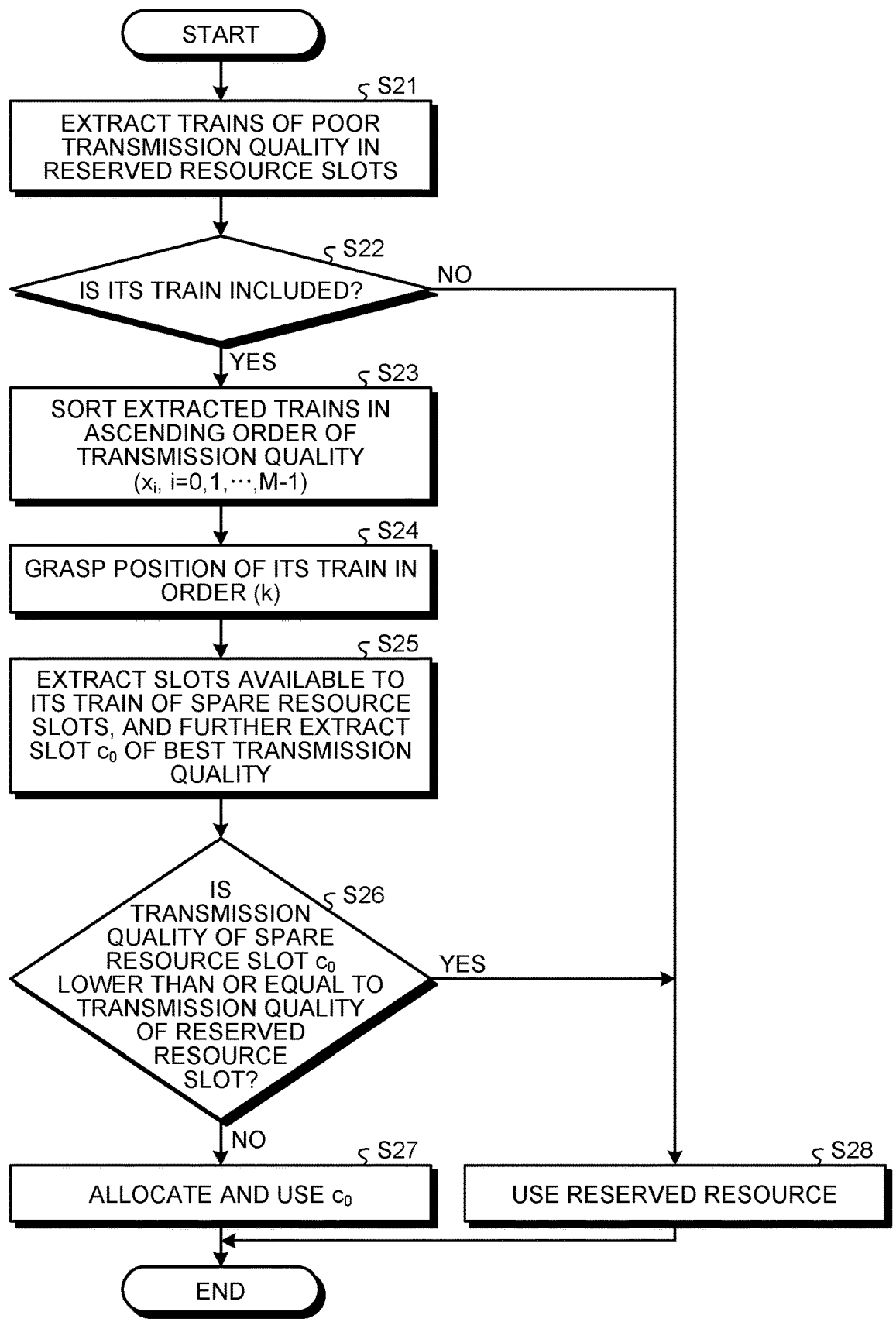
FIG. 21 is a flowchart illustrating a resource allocation operation of a resource allocation unit of the on-board station according to the second embodiment.

The resource allocation operation of the resource allocation unit 207 of the on-board station 2a will be described with reference to a flowchart. FIG. 21 is a flowchart illustrating the resource allocation operation of the resource allocation unit 207 of the on-board station 2a according to the second embodiment. The resource allocation unit 207 starts the resource allocation operation according to an instruction from the on-board control unit 204.

First, the resource allocation unit 207 grasps the number of reserved resources from the reserved resource information illustrated in FIG. 20, and extracts, based on the transmission quality information illustrated in FIG. 19, a train 3 that uses a slot of poor transmission quality of reserved resource slots (step S21). A transmission quality determination method in the resource allocation unit 207 is the same as the transmission quality determination method in the resource allocation unit 107 of the first embodiment. For the frame #3 illustrated in FIG. 14, the resource allocation unit 207 determines that the transmission quality of both of the trains (1) and (2) is poor because the transmission quality is lower than or equal to evaluation value 1. The resource allocation unit 207 extracts the trains (1) and (2).

The resource allocation unit 207 determines whether or not the extracted trains 3 include its train (step S22). If the extracted trains 3 do not include its train (step S22: No), the resource allocation unit 207 uses the reserved resource without change (step S28) and finishes the processing. If the extracted trains 3 include its train (step S22: Yes), the resource allocation unit 207 sorts the trains 3 extracted in step S21 in ascending order of transmission quality (step S23). Since the transmission quality of the frequency channel 1 used by the train (1) is evaluation value 1, and the transmission quality of the frequency channel 0 used by the train (2) is evaluation value 0, the resource allocation unit 207 sorts them in the order of the trains (2) and (1). The resource allocation unit 207 grasps the position of its train in the order (step S24). For the frame #3 illustrated in FIG. 14, the resource allocation unit 207 of the train (1) grasps that it is in the second position or k=1, and the resource allocation unit 207 of the train (2) that it is in the first position or k=0.

The resource allocation unit 207 extracts spare resource slots available to its train from the spare resource slots. Further, the resource allocation unit 207 extracts a slot $c_0$ of the best transmission quality of the extracted available spare resource slots (step S25). Here, the spare resource slots available to its train are those corresponding the position in the order of its train grasped in step S24 among the spare resource slots divided by the number of trains extracted in step S21 according to a predetermined rule so that the trains 3 do not use the same spare resource slot. For example, the resource allocation unit 207 divides the spare resources according to equation (1).

$$r_{k,p} = M \times p + k (p=0,1,2, \ldots, \text{and } r_{k,p} \text{ is less than or equal to the number of spare resources} - 1) \quad (1)$$

Figure 22:
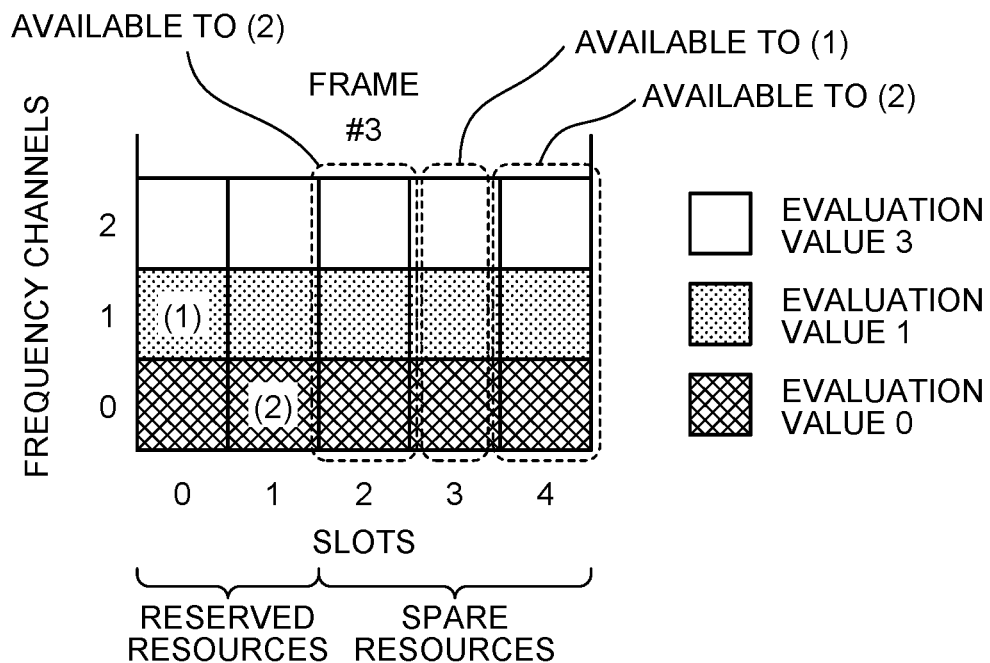
FIG. 22 is a diagram illustrating an example in which the resource allocation unit of each on-board station extracts a spare resource slot(s) available to its train according to the second embodiment.

Here, M is the number of trains of poor transmission quality extracted in step S21, and k represents the order when the trains are sorted in ascending order of transmission quality in step S23. FIG. 22 is a diagram illustrating an example in which the resource allocation unit 207 of each on-board station 2a extracts a spare resource slot(s) available to its train according to the second embodiment. In the example of the frame #3 illustrated in FIG. 14, as illustrated in FIG. 22, among the spare resource slots 2, 3, and 4, the train (2) of k=0 can use the slots 2 and 4, and the train (1) of k=1 can use the slot 3. The resource allocation unit 207 further extracts the slot $c_0$ of the best transmission quality from the extracted spare resource slot(s) available to its train. In the example of the frame #3 illustrated in FIG. 22, the resource allocation unit 207 of the train (2) extracts the slot 2 as the slot ca. The resource allocation unit 207 of the train (1) extracts the slot 3 as the slot cu.

The resource allocation unit 207 determines whether or not the transmission quality of the extracted spare resource slot $c_0$ is lower than or equal to the transmission quality of the reserved resource slot allocated to its train (step S26). If the transmission quality of the extracted spare resource slot $c_0$ is better than the transmission quality of the reserved resource slot allocated to its train (step S26: No), the resource allocation unit 207 allocates the extracted spare resource slot $c_0$ to its train for use (step S27). If the transmission quality of the extracted spare resource slot $c_0$ is lower than or equal the transmission quality of the reserved resource slot allocated to its train (step S26: Yes), the resource allocation unit 207 uses the reserved resource slot allocated to its train (step S28).

Figure 23:
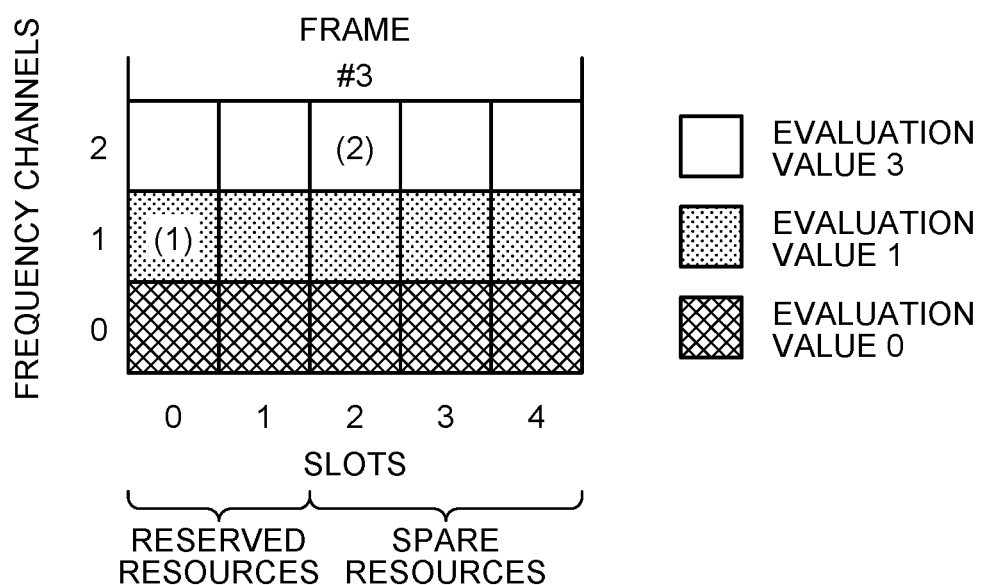
FIG. 23 is a diagram illustrating an example in which the resource allocation unit allocates a spare resource slot to the train whose reserved resource slot is of poor transmission quality according to the second embodiment.

FIG. 23 is a diagram illustrating an example in which the resource allocation unit 207 allocates a spare resource slot to the train 3 whose reserved resource slot is of poor transmission quality according to the second embodiment. Specifically, in the example of FIG. 22, the resource allocation unit 207 of the train (2) chooses to allocate and use the extracted spare resource slot 2 because the transmission quality of the spare resource slot 2 is better than the transmission quality of the reserved resource slot 1. The resource allocation unit 207 of the train (1) chooses to use the reserved resource slot 0 because the transmission quality of the extracted spare resource slot 3 is the same as the transmission quality of the reserved resource slot 0. If the trains 3 cannot receive the notification information from the ground station 1a and cannot obtain the transmission quality information illustrated in FIG. 19 and the reserved resource information illustrated in FIG. 20, each does not perform the operation of the flowchart in FIG. 21 and performs transmission using the original reserved resource slot.

As described above, according to the second embodiment, each on-board station 2a performs radio resource allocation. Consequently, load in radio resource allocation processing can be distributed as compared with the case where the ground station 1 performs it all. Further, when the transmission quality information illustrated in FIG. 19 and the reserved resource information illustrated in FIG. 20 are compared with the slot allocation information illustrated in FIG. 13, if the number of radio resource slots is large, the amount of information transmitted by the ground station 1 in the notification information can be reduced. Furthermore, each train 3 allocates a spare resource slot according to the predetermined rule and thus can perform transmission using a frequency channel of good transmission quality without colliding with data transmission of another train 3, allowing higher quality and more stable wireless transmission.

Third Embodiment

In a third embodiment, a case where the evaluation of transmission quality has a wide range, a case where response to changes in transmission quality is strengthened, etc. will be described. Here, the description uses the second embodiment as an example, but the present embodiment is also applicable to the first embodiment.

Figure 24:
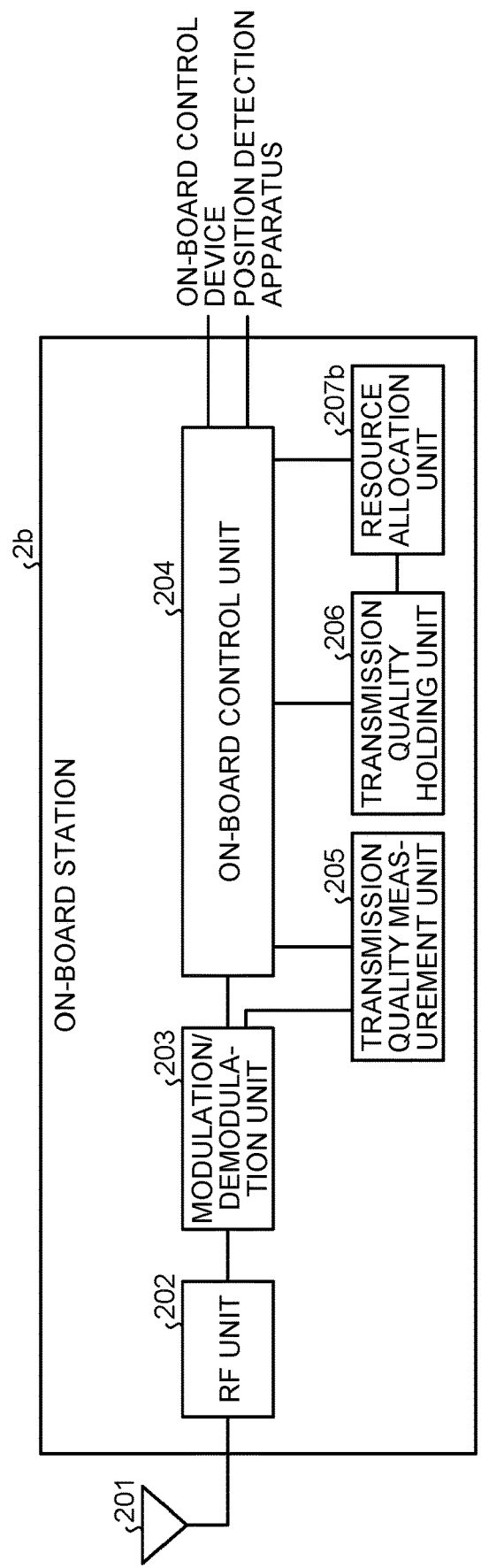
FIG. 24 is a block diagram illustrating a configuration example of an on-board station according to a third embodiment.

FIG. 24 is a block diagram illustrating a configuration example of an on-board station 2b according to the third embodiment. Compared to the on-board station 2a of the second embodiment illustrated in FIG. 18, the on-board station 2b includes a resource allocation unit 207b in the place of the resource allocation unit 207. The detailed operation of the resource allocation unit 207b will be described later.

Figure 25:
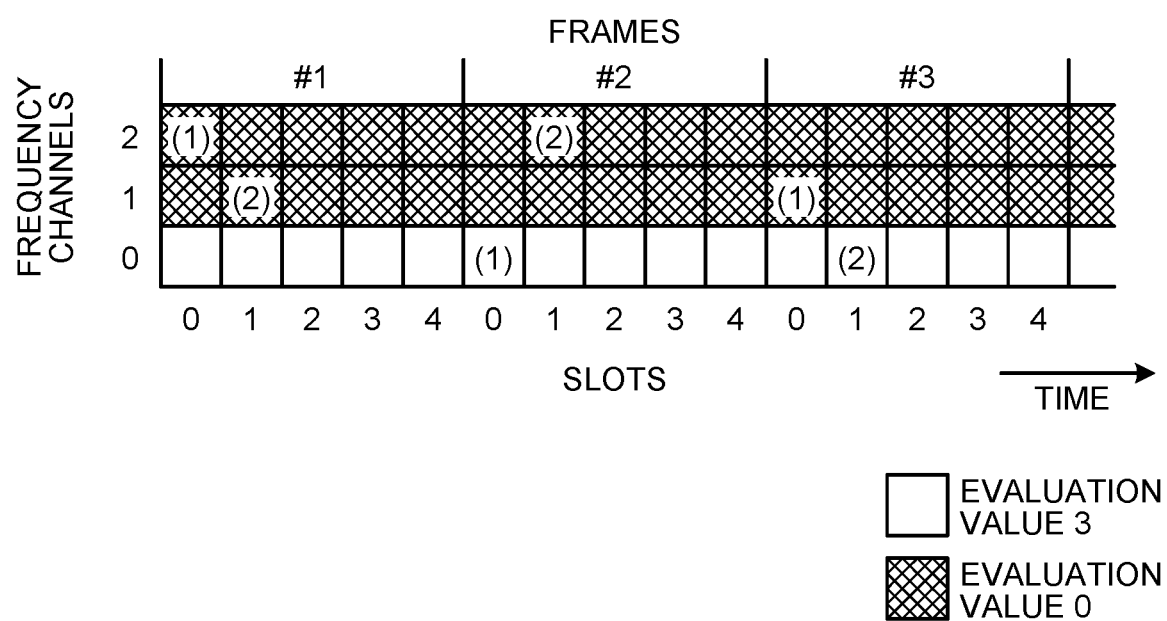
FIG. 25 is a diagram illustrating an example of resource allocation to trains and the transmission quality of frequency channels according to the third embodiment.
Figure 26:
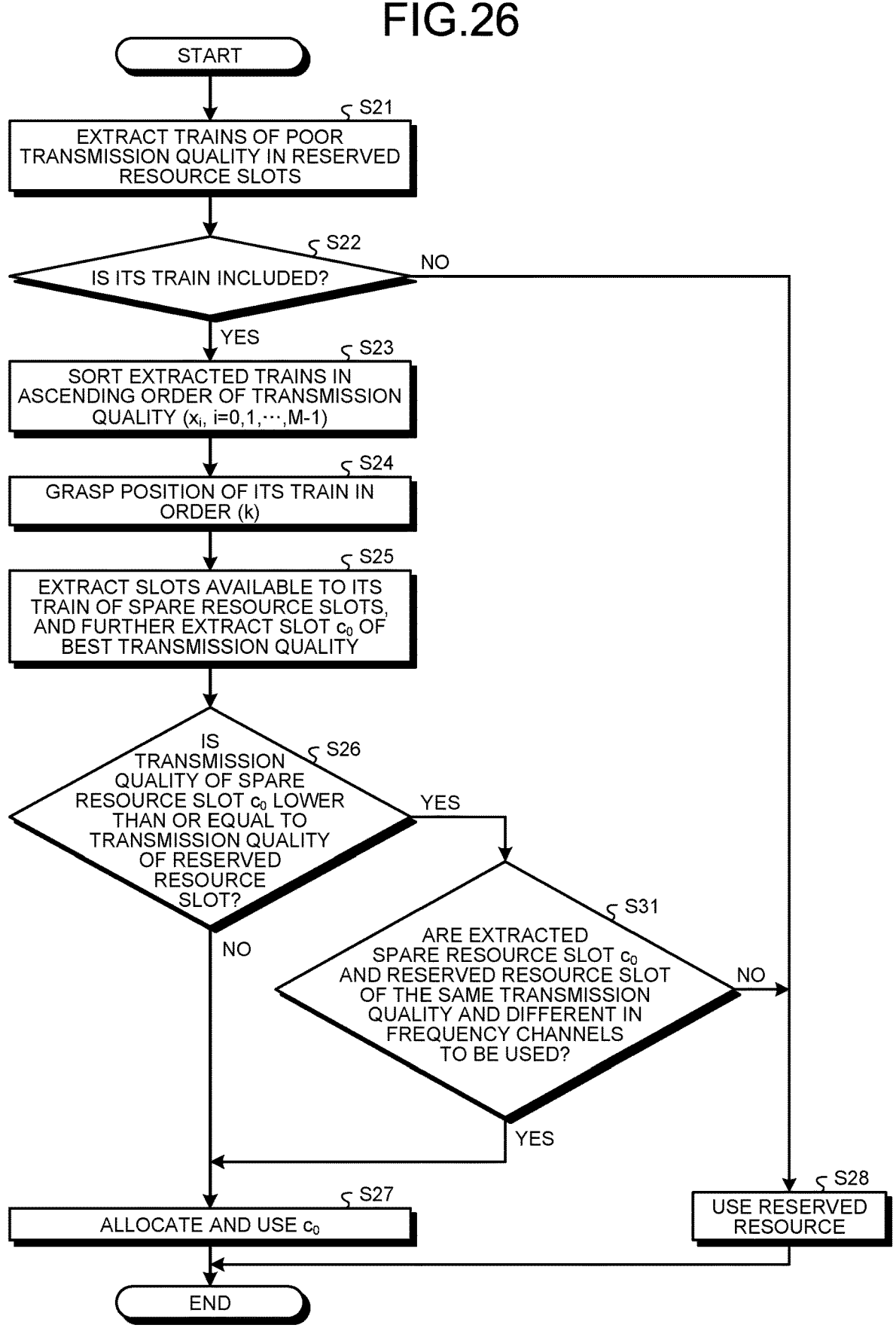
FIG. 26 is a flowchart illustrating a resource allocation operation of a resource allocation unit of the on-board station according to the third embodiment.

FIG. 25 is a diagram illustrating an example of resource allocation to the trains 3 and the transmission quality of the frequency channels according to the third embodiment. The example of frames illustrated in FIG. 25 shows that the frequency channels 1 and 2 are of evaluation value 0 and poor transmission quality, and the frequency channel 0 is of evaluation value 3 and good transmission quality. The resource allocation operation of the resource allocation unit 207b of the on-board station 2b will be described using the frame #1 illustrated in FIG. 25 as an example, with reference to a flowchart. FIG. 26 is a flowchart illustrating the resource allocation operation of the resource allocation unit 207b of the on-board station 2b according to the third embodiment. The resource allocation unit 207b starts the resource allocation operation according to an instruction from the on-board control unit 204.

In the flowchart illustrated in FIG. 26, operation from step S21 to step S27 is the same as the operation from step S21 to step S27 in the flowchart of the second embodiment illustrated in FIG. 21. In the example of the frame #1 illustrated in FIG. 25, the resource allocation unit 207b extracts the trains (1) and (2) in step S21 and sorts them in the order of the trains (1) and (2) in step S23. In step S25, the resource allocation unit 207b of the train (1) extracts the slots 2 and 4 as spare resource slots available to its train among the spare resource slots, and further extracts the slot 2 as the slot $c_0$ of the best transmission quality. In step S25, the resource allocation unit 207b of the train (2) extracts the slot 3 as a spare resource slot available to its train among the spare resource slots, and further extracts the slot 3 as the slot c; of the best transmission quality.

The resource allocation unit 207b of the train (1) allocates the extracted spare resource slot 2 to its train for use (step S27) because the transmission quality of the extracted spare resource slot 2 is better than the transmission quality of the reserved resource slot 0 allocated to its train (step S26: No).

The resource allocation unit 207b of the train (2) performs determination in step S31 because the transmission quality of the extracted spare resource slot 3 is the same as the transmission quality of the reserved resource slot 1 allocated to its train (step S26: Yes). Specifically, the resource allocation unit 207b of the train (2) determines whether or not the extracted spare resource slot $c_0$ and the reserved resource slot are of the same transmission quality and use different frequency channels (step S31). Step S31 is intended that if the transmission quality of the extracted spare resource slot $c_0$ is the same as the transmission quality of the reserved resource slot, the resource allocation unit 207b check it against past used resources and choose to actively use a frequency channel different from the most recently used frequency channel.

The resource allocation unit 207b of the train (2) allocates the extracted spare resource slot 3 to its train for use (step S27) because the extracted spare resource slot 3 and the reserved resource slot 1 are of the same transmission quality and use different frequency channels (step S31: Yes). If at least one of the conditions that the extracted spare resource slot $c_0$ and the reserved resource slot are of the same transmission quality and use different frequency channels is not satisfied (step S31: No), the resource allocation unit 207b of the train (2) uses the reserved resource slot allocated to its train (step S28).

Figure 27:
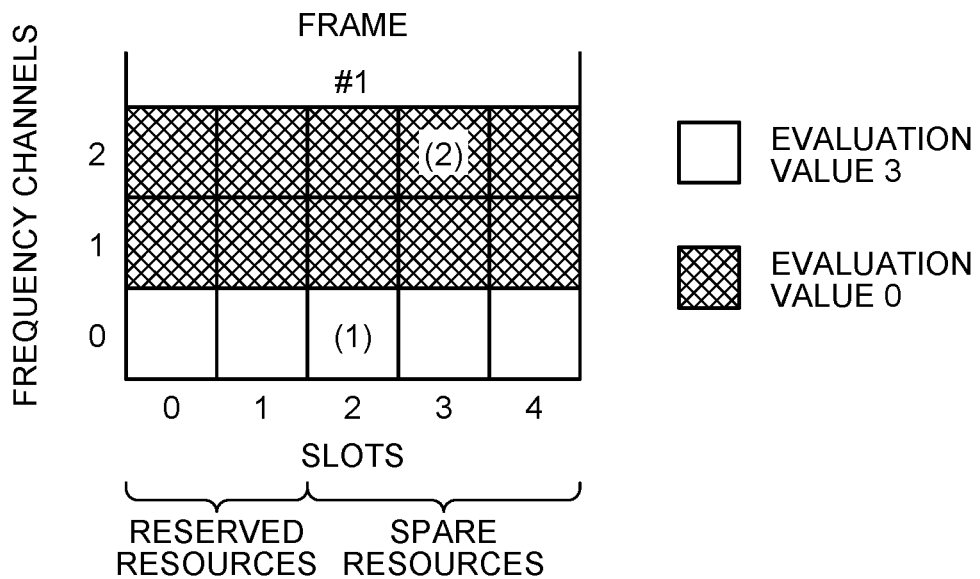
FIG. 27 is a diagram illustrating an example in which a train whose reserved resource slot is of poor transmission quality allocates a spare resource slot or changes a frequency channel for use in a frame according to the third embodiment.

FIG. 27 is a diagram illustrating an example in which a train 3 whose reserved resource slot is of poor transmission quality allocates a spare resource slot or changes a frequency channel for use in a frame according to the third embodiment. Specifically, in the example of FIG. 25, the resource allocation unit 207b of the train (1) chooses to allocate and use the extracted spare resource slot 2 because the transmission quality of the spare resource slot 2 is better than the transmission quality of the reserved resource slot 0. The resource allocation unit 207b of the train (2) chooses to use the extracted spare resource slot 3 because although the transmission quality of the spare resource slot 3 is the same as the transmission quality of the reserved resource slot 1, the frequency channel of the slot 3 is different from the frequency channel of the slot 1. In this way, if the transmission quality of a spare resource time slot is the same as the transmission quality of a reserved resource time slot, the resource allocation unit 207b preferentially allocates the spare resource time slot that uses a frequency channel different from a frequency channel used in the reserved resource time slot.

As described above, according to the third embodiment, if the transmission quality of a spare resource slot and the transmission quality of a reserved resource slot are the same, the on-board station 2b checks it against past used resources and actively uses a frequency channel different from those in the past. Consequently, if there is a difference in transmission quality classified into the same evaluation value, or if there is a change from transmission quality transmitted in notification information, the on-board station 2b obtains a frequency diversity effect and can perform higher quality and more stable wireless transmission.

Here, the hardware configurations of the ground station 1 and the on-board station 2 described in the first embodiment, the ground station 1a and the on-board station 2a described in the second embodiment, and the on-board station 2b described in the third embodiment will be described. Since the ground stations 1 and 1a have similar configurations, the ground station 1 will be described as an example. Since the on-board stations 2, 2a, and 2b have similar configurations, the on-board station 2a will be described as an example. The antenna 101 of the ground station 1 and the antenna 201 of the on-board station 2a are antenna elements. The RF unit 102 of the ground station 1 and the RF unit 202 of the on-board station 2a are each formed of an analog circuit, an analog-to-digital converter, a digital-to-analog converter, or the like that performs frequency conversion etc. In the ground station 1, the modulation/demodulation unit 103, the ground control unit 104, the transmission quality measurement unit 105, the transmission quality holding unit 106, and the resource allocation unit 107 are implemented by processing circuitry. In the on-board station 2a, the modulation/demodulation unit 203, the on-board control unit 204, the transmission quality measurement unit 205, the transmission quality holding unit 206, and the resource allocation unit 207 are implemented by processing circuitry.

The processing circuitry may be dedicated hardware, or may be a control circuit including a memory and a processor that executes programs stored in the memory. The processor may be a central processing unit (CPU), a central processor, a processing unit, an arithmetic unit, a microprocessor, a microcomputer, a digital signal processor (DSP), or the like. The memory corresponds to nonvolatile or volatile semiconductor memory such as random-access memory (RAM), read-only memory (ROM), flash memory, an erasable programmable read-only memory (EPROM), or an electrically erasable programmable read-only memory (EEPROM) (registered trademark), or a magnetic disk, a flexible disk, an optical disk, a compact disk, a mini disk, a digital versatile disk (DVD), or the like.

Figure 28:
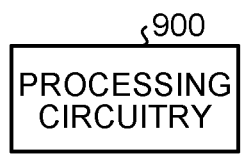
FIG. 28 is a diagram illustrating an example where processing circuitry included in each ground station or each on-board station is formed of dedicated hardware.

FIG. 28 is a diagram illustrating an example in which the processing circuitry included in the ground station 1 or the on-board station 2a is formed of dedicated hardware. When the processing circuitry is implemented by dedicated hardware, the processing circuitry is a processing circuitry 900 illustrated in FIG. 28. The processing circuitry 900 is, for example, a single circuit, a combined circuit, a programmed processor, a parallel-programmed processor, an application-specific integrated circuit (ASIC), a field-programmable gate array (FPGA), or a combination of them.

Figure 29:
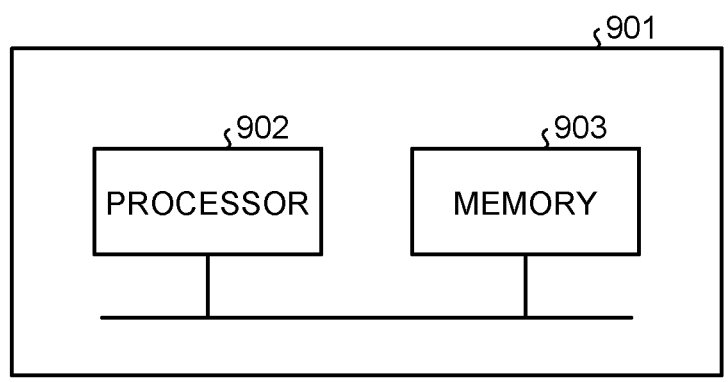
FIG. 29 is a diagram illustrating an example where the processing circuitry included in each ground station or each on-board station is formed of a control circuit including a processor.

FIG. 29 is a diagram illustrating an example in which the processing circuitry included in the ground station 1 or the on-board station 2a is formed of a control circuit including a processor. When the processing circuitry is formed of a control circuit including a processor, the control circuit is, for example, a control circuit 901 illustrated in FIG. 29. The control circuit 901 includes a processor 902 and a memory 903. The processing circuitry included in the ground station 1 or the on-board station 2a is implemented by the processor 902 reading and executing programs corresponding to the components stored in the memory 903. The memory 903 is also used as temporary memory in individual processing executed by the processor 902.

The wireless communication apparatus according to the present disclosure has the effect of being able to perform wireless communication while reducing interference when performing wireless communication using a frequency-hopping method.

The configurations described in the above embodiments illustrate an example, and can be combined with another known art, and can be partly omitted or changed without departing from the gist.

What is claimed is:

1. A wireless communication apparatus to allocate radio resources, which is a base station or a mobile station to transmit a data series on a frequency channel in a frequency hopping pattern corresponding to a radio resource time slot, the apparatus comprising:
 a transmission quality measurement circuitry to measure radio waves in a frequency band used in the transmission of the data series and evaluate transmission quality of each frequency channel; and
 the radio resources including a reserved resource that is a time slot fixedly allocated to the mobile station located in a cell that is a communication range of the base station, and a spare resource that is a time slot that can be allocated to the mobile station located in the cell, a resource allocation circuitry to
 determine, based on the transmission quality of each frequency channel evaluated by the transmission quality measurement circuitry, whether the following apply: (1) the mobile station's transmission quality of the frequency channel used in the reserved time slot is lower than or equal to a threshold value, and (2) the spare resource time slot uses a frequency channel that is of the same transmission quality as, but a different frequency band than, the frequency channel used in the reserved resource time slot, and
 in response to determining both (1) and (2) apply, allocate the spare resource time slot to the mobile station, wherein the mobile station transmits the data series, using the spare resource time slot indicated by allocation information that indicates the spare resource allocated by the resource allocation circuitry when the allocation information is obtained, or using the reserved resource time slot when the allocation information is not obtained.

2. The wireless communication apparatus according to claim 1, wherein
the base station that is the wireless communication apparatus notifies the mobile station of the allocation information.

3. The wireless communication apparatus according to claim 1, wherein
the base station notifies the mobile station of notification information including information on the transmission quality and information on the reserved resource, and
the mobile station that is the wireless communication apparatus performs allocation of a radio resource to be used based on a specified rule, using the notification information.

4. A wireless communication system comprising
a plurality of the wireless communication apparatuses according to claim 1.

5. A wireless communication system comprising
a plurality of the wireless communication apparatuses according to claim 2.

6. A wireless communication system comprising
a plurality of the wireless communication apparatuses according to claim 3.

7. A wireless communication method in a wireless communication apparatus to allocate radio resources, which is a base station or a mobile station to transmit a data series on a frequency channel in a frequency hopping pattern corresponding to a radio resource time slot, the method comprising:
by a transmission quality measurement circuitry, measuring radio waves in a frequency band used in the transmission of the data series and evaluating transmission quality of each frequency channel; and
the radio resources including a reserved resource that is a time slot fixedly allocated to the mobile station located in a cell that is a communication range of the base station, and a spare resource that is a time slot that can be allocated to the mobile station located in the cell, by a resource allocation circuitry,
determining, based on the transmission quality of each frequency channel evaluated by the transmission quality measurement circuitry, whether the following apply: (1) the mobile station's transmission quality of the frequency channel used in the reserved time slot is lower than or equal to a threshold value, and (2) the spare resource time slot uses a frequency channel that is of the same transmission quality as, but a different frequency band than, the frequency channel used in the reserved resource time slot, and
in response to determining both (1) and (2) apply, allocating the spare resource time slot to the mobile station, wherein
the mobile station transmits the data series, using the spare resource time slot indicated by allocation information that indicates the spare resource allocated by the resource allocation circuitry when the allocation information is obtained, or using the reserved resource time slot when the allocation information is not obtained.

8. A control circuit to control a wireless communication apparatus to allocate radio resources, which is a base station or a mobile station to transmit a data series on a frequency channel in a frequency hopping pattern corresponding to a radio resource time slot,
the control circuit causing the wireless communication apparatus to
measure radio waves in a frequency band used in the transmission of the data series and evaluate transmission quality of each frequency channel, and
the radio resources including a reserved resource that is a time slot fixedly allocated to the mobile station located in a cell that is a communication range of the base station, and a spare resource that is a time slot that can be allocated to the mobile station located in the cell,
determine, based on the evaluated transmission quality of each frequency channel, whether the following apply: (1) the mobile station's transmission quality of the frequency channel used in the reserved time slot is lower than or equal to a threshold value, and (2) the spare resource time slot uses a frequency channel that is of the same transmission quality as, but a different frequency band than, the frequency channel used in the reserved resource time slot, and
in response to determining both (1) and (2) apply, allocate the spare resource time slot to the mobile station, wherein
the mobile station transmits the data series, using the spare resource time slot indicated by allocation information that indicates the spare resource allocated by the control circuit when the allocation information is obtained, or using the reserved resource time slot when the allocation information is not obtained.

9. A non-transitory computer-readable recording medium that stores therein a control program for causing a wireless communication apparatus to perform the wireless communication method according to claim 7.

* * * * *